United States Patent
Yamamoto

(10) Patent No.: US 10,845,657 B2
(45) Date of Patent: Nov. 24, 2020

(54) DISPLAY DEVICE AND HEAD-MOUNTED DISPLAY

(71) Applicant: SHARP KABUSHIKI KAISHA, Sakai (JP)

(72) Inventor: Keiichi Yamamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 64 days.

(21) Appl. No.: 16/082,706

(22) PCT Filed: Mar. 3, 2017

(86) PCT No.: PCT/JP2017/008564
§ 371 (c)(1),
(2) Date: Sep. 6, 2018

(87) PCT Pub. No.: WO2017/154789
PCT Pub. Date: Sep. 14, 2017

(65) Prior Publication Data
US 2019/0079360 A1  Mar. 14, 2019

(30) Foreign Application Priority Data

Mar. 10, 2016 (JP) .................. 2016-046707

(51) Int. Cl.
| G02F 1/1335 | (2006.01) |
| G02F 1/1362 | (2006.01) |
| G09G 3/36 | (2006.01) |
| G02B 27/01 | (2006.01) |
| G02F 1/1343 | (2006.01) |

(52) U.S. Cl.
CPC ..... *G02F 1/136209* (2013.01); *G02B 27/017* (2013.01); *G02B 27/0172* (2013.01); *G02F 1/133512* (2013.01); *G02F 1/136286* (2013.01); *G09G 3/3607* (2013.01); *G02F 2001/134345* (2013.01); *G02F 2001/136222* (2013.01); *G02F 2201/123* (2013.01)

(58) Field of Classification Search
None
See application file for complete search history.

(56) References Cited

U.S. PATENT DOCUMENTS

| 5,781,262 | A | 7/1998 | Suzuki et al. | |
| 6,081,314 | A | 6/2000 | Suzuki et al. | |
| 6,323,922 | B1 | 11/2001 | Suzuki et al. | |
| 2008/0198308 | A1 | 8/2008 | Lee et al. | |
| 2011/0128280 | A1* | 6/2011 | Tseng | G02F 1/133512 345/214 |
| 2015/0362803 | A1* | 12/2015 | Ahn | G02F 1/133703 349/123 |

FOREIGN PATENT DOCUMENTS

| JP | H08-136931 A | 5/1996 |
| JP | 2009-145426 A | 7/2009 |

* cited by examiner

*Primary Examiner* — Richard H Kim
(74) *Attorney, Agent, or Firm* — ScienBiziP, P.C.

(57) ABSTRACT

A liquid crystal panel (a display device) 10 includes pixel sections PX, a black matrix (a pixel in-between light blocking section) 10*i* disposed to define each of the pixel sections PX that are adjacent to each other, TFTs (switching components) 11 connected to the pixel sections PX and configured to drive the pixel sections PX, respectively, and a divisional light, blocking section 22 disposed to divide the pixel section PX into divided pixels PPX.

6 Claims, 21 Drawing Sheets

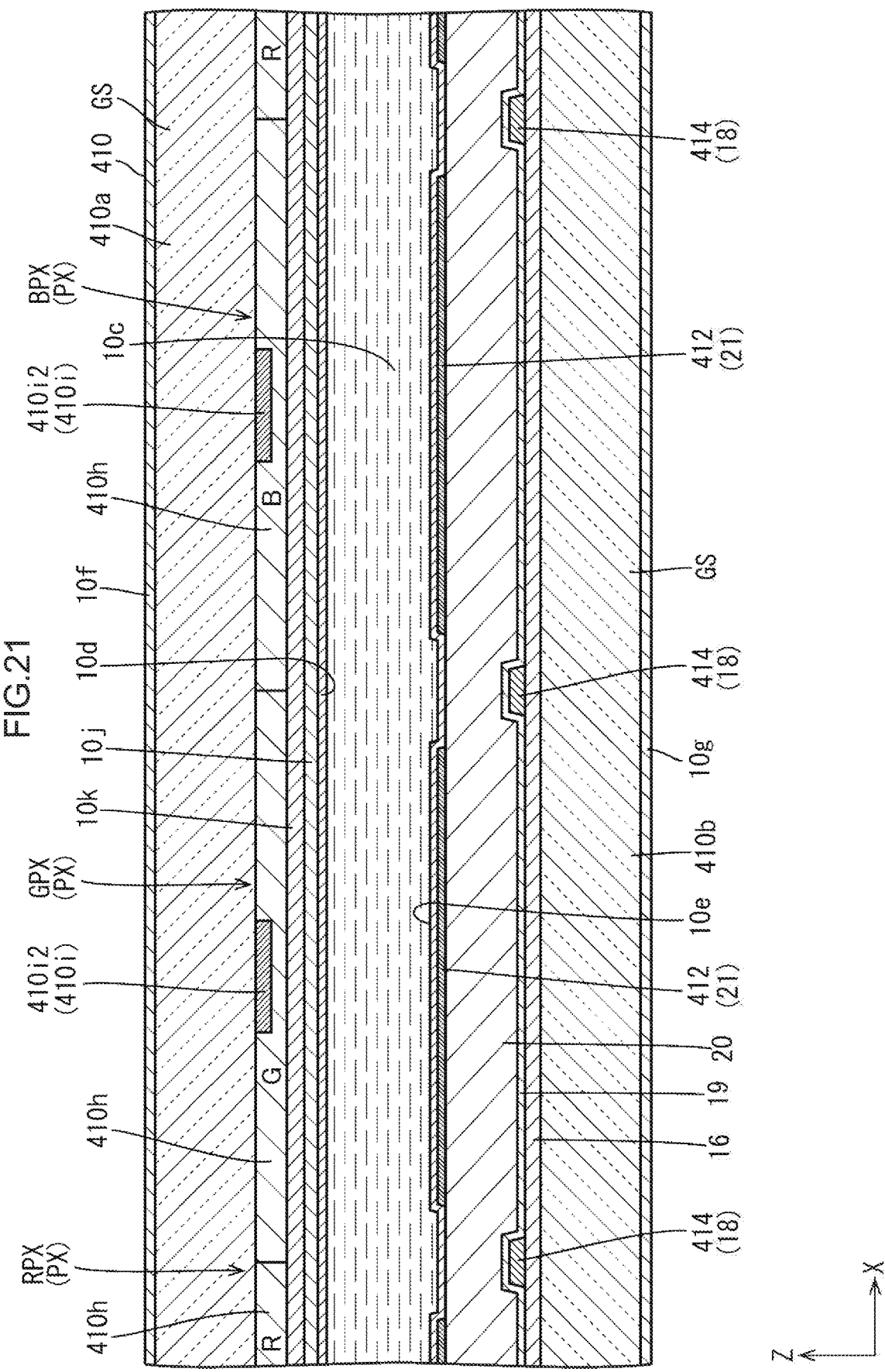

DISPLAY DEVICE AND HEAD-MOUNTED DISPLAY

TECHNICAL FIELD

The present invention relates to a display device and a head-mounted display.

BACKGROUND ART

An example of a known liquid crystal display device is described in Patent Document 1. The liquid crystal display device described in Patent Document 1 displays an image that can be visible independently from multiple directions such as the upper, lower, left, and right directions. The liquid crystal panel has a plurality of pixels, and the pixel includes sub-pixels on respective two positions in two directions orthogonal each other. Namely, the pixel includes sub-pixels on respective two positions in the horizontal scanning direction, and includes sub-pixels on respective two positions in the vertical scanning direction. The liquid crystal panel further includes a hole that is smaller than the pixel at a middle of the pixel.

RELATED ART DOCUMENT

Patent Document

Patent Document 1: Japanese Unexamined Patent Application Publication No. 2009-145426

Problem to be Solved by the Invention

In the liquid crystal display device described in Patent Document 1, independent image information is selectively supplied to each of the four sub-pixels included in one pixel such that each sub pixel displays different images.

In a system including a head-mounted display that has been spread recently, images displayed on a liquid crystal panel are magnified with a lens and are seen by a user. Therefore, the black matrix disposed between the pixels is likely to be seen as a mesh-shaped black display section.

DISCLOSURE OF THE PRESENT INVENTION

An object of the present invention is to improve display quality.

Means for Solving the Problem

A display device according to the present invention includes pixel sections, a pixel in-between light blocking section disposed to define each of the pixel sections that are adjacent to each other, switching components connected to the pixel sections and configured to drive the pixel sections, respectively, and a divisional light blocking section disposed to divide the pixel section into divided pixels.

According to such a configuration, each of the pixel sections is driven independently by each of the switching components connected to the corresponding pixel section such that a certain image is displayed. The adjacent pixel sections are divided by the pixel in-between light blocking section and the display operation with each pixel section is surely independent. The pixel section is divided into divided pixels by the divisional light blocking section and therefore, the definition of the display device is falsely improved and the pixel in-between light blocking section is less likely to be seen. Therefore, the pixel in-between light blocking section is less likely to be seen as the black display section between the adjacent pixel sections and display quality is improved.

Preferable embodiments of the present invention may include the following configurations.

(1) The display device may further include a first board at least including pixel electrodes included in the pixel sections and the switching components and a second board at least including color portions included in the pixel sections and the pixel in-between light blocking section. The divisional light, blocking section may be included in a same layer as the pixel in-between light blocking section on the second board. According to such a configuration, the pixel electrodes of the respective pixel sections are charged at a certain potential with the switching components. The amount of transmission rays of light transmitting through the color portion of each pixel section is controlled based on the potential of each pixel electrode such that display operation is performed in each of the pixel sections at a certain gradation. The divisional light blocking sections are included in the same layer as the black matrix 10i on the second board and the divisional light blocking sections are included on the second board. Therefore, a board of a conventional configuration can be used as the first board.

(2) The display device may further include a first board at least including pixel electrodes included in the pixel sections and the switching components and a second board at least including color portions included in the pixel sections and the pixel in-between light blocking section. The divisional light blocking section may be included on the first board. According to such a configuration/the pixel electrodes of the pixel sections are charged at the predetermined potential with the switching components. The amount of transmission rays of light transmitting through the color portion of each pixel section is controlled based on the potential of each pixel electrode such that display operation is performed in each of the pixel sections at a certain gradation. The divisional light blocking sections are disposed on the first board and therefore, a board having the conventional structure can be used as the second board.

(3) The first board may at least, include a first metal film, an insulation film disposed on the first metal film, a second metal film disposed on the insulation film/first lines formed from the first metal film and connected to the switching components, respectively, and second lines formed from the second metal film and crossing the first lines and connected to the switching components, respectively, and the divisional light blocking section may partially overlap the pixel in-between light blocking section and may not overlap the first lines and the second lines. According to the configuration that the divisional light blocking section partially overlaps the pixel in-between light blocking section, the pseudo definition improvement is effectively obtained. The divisional light blocking sections that are made of conductive material do not overlap the first lines and the second lines. According to such a configuration, the parasitic capacitance is less likely to be generated between the divisional light blocking sections and each of the first lines and the second lines. Accordingly, delay is less likely to be caused in signals transmitted to the first lines and the second lines.

(4) The first board may at least include a third metal film in a different layer from the first metal film and the second metal film, and the divisional light blocking section may be formed from the third metal film. According to such a configuration, in producing the display device, the divisional light blocking sections can be formed in a process different from the processes of forming the first lines and the second lines. A device used in the process of forming the divisional light blocking sections is different from a device used in the process of forming the first lines and the second lines. Therefore, there is less restriction required in forming the divisional light blocking sections.

(5) The divisional light blocking section may be formed from at least one of the first metal film and the second metal film. According to such a configuration, in producing the display device, the divisional light blocking sections can be formed in the process of forming the first lines or the second lines. Therefore, a device exclusive for forming the divisional light blocking sections is not necessary and a manufacturing cost can be preferably reduced.

(6) The divisional light blocking section may include a first line parallel section that extends in an extending direction of the first lines and is formed from the second metal film and a second line parallel section that extends in an extending direction of the second lines and is formed from the first metal film. According to such a configuration, the first line parallel section that is formed from, the second metal film is less likely to cause any restriction in designing intervals between adjacent first lines. Similarly, the second line parallel section that is formed from the first metal film is less likely to cause any restriction in designing intervals between adjacent second lines.

(7) The display device may further include a first board at least including pixel electrodes included in the pixel sections and the switching components and a second board at least including color portions included in the pixel sections and the pixel in-between light blocking section. The divisional light blocking section may be included on the first board and the second board. According to such a configuration, the pixel electrodes of the respective pixel sections are charged at a certain potential with the switching components. The amount of transmission rays of light transmitting through the color portion of each pixel section is controlled based on the potential of each pixel electrode such that display operation is performed in each of the pixel sections at a certain gradation. The divisional light blocking sections are included dispersedly on the first board and the second board. According to such a configuration, the divisional light blocking sections are less likely to cause any restriction in producing the first board and the second board compared to a configuration including the divisional light blocking sections on one of the first board and the second board.

(8) The first, board may at least include a first metal film, an insulation film disposed on the first metal film, a second metal film disposed on the insulation film, first lines formed from the first metal film and connected to the switching components, respectively, and second lines formed from the second metal film and crossing the first lines and connected to the switching components, respectively, and the divisional light blocking section may include a first line parallel section that is included on the second board and extends in an extending direction of the first lines and is included in a same layer as the pixel in-between light blocking section and a second line parallel section that is included on the first board and extends in an extending direction of the second lines and is formed from the first metal film. The pixel in-between light blocking section that defines each of the adjacent pixel sections overlaps the first lines and the second lines. The interval between the adjacent first lines is generally larger than an interval between the adjacent second lines. Therefore, the first line parallel sections that are included in the same layer as the pixel in-between light blocking section on the second board are formed easily. The second line parallel section that is formed from the first metal film on the first board is less likely to cause any restriction in designing the interval between the adjacent second lines.

(9) The display device may further include a first board at least including pixel electrodes included in the pixel sections, the switching components, first lines connected to the switching components, respectively, and second lines crossing the first lines and connected to the switching components, respectively, and a second board at least including color portions included in the pixel sections. The pixel in-between light blocking section may be comprised of the first lines and the second lines, and the divisional light blocking section may be disposed on the second board to divide the color portion into multiple sections. According to such a configuration, the pixel electrodes of the respective pixel sections are charged at a certain potential with the switching components. The amount of transmission rays of light transmitting through the color portion of each pixel section is controlled based on the potential of each pixel electrode such that display operation is performed in each of the pixel sections at a certain gradation. The divisional light blocking section is disposed on the second board and divides the color portion of each pixel section into multiple sections. The divisional light blocking section is included on the second board and therefore, a board having the conventional structure can be used as the first board. The pixel in-between light blocking section is configured with the first lines and the second lines on the first board and is not disposed on the second board. Therefore, there is less restriction in designing the divisional light blocking section.

(10) The divisional light blocking section may be narrower than the pixel in-between light blocking section. According to such a configuration, lowering of the aperture rate of the pixel section due to the divisional light blocking section is less likely to be caused and the pseudo definition improvement is effectively obtained.

(11) Each of the pixel sections may have a square plan view shape, and the divisional light blocking section may divide the pixel section into four divided pixels such that the divided pixel has a shape similar to that of the pixel section. According to such a configuration, the pseudo definition improvement obtained by the divisional light blocking sections is effectively obtained and the display quality is further improved.

To solve the above problems, a head-mounted display of the present invention at least includes the above-described display device, a lens through which an image displayed on the display device is formed on a user's eye, and a head mounting device including the display device and the lens and mounted on a user's head. According to the head-mounted display of such a configuration, if the user uses the head mounting device mounted on the head, the image displayed on the display device is formed on the user's eye through the lens and the user can see the image displayed on the display device as a magnified image. If the user sees the image displayed on the display device as a magnified image, the pixel in-between light blocking section is likely to be seen as the black display section. However, the pixel section is divided into multiple divided pixels with the divisional light blocking section such that the pixel in-between light blocking section is less likely to be seen and the pixel in-between light blocking section is less likely to be seen as the black display section and good display quality can be obtained.

Advantageous Effect of the Invention

According to the present invention, display quality can be improved.

BRIEF DESCRIPTION OF THE DRAWINGS

FIG. 21 is a cross-sectional view taken along line B-B in FIG. 18.

MODES FOR CARRYING OUT THE INVENTION

First Embodiments

Figure 1:
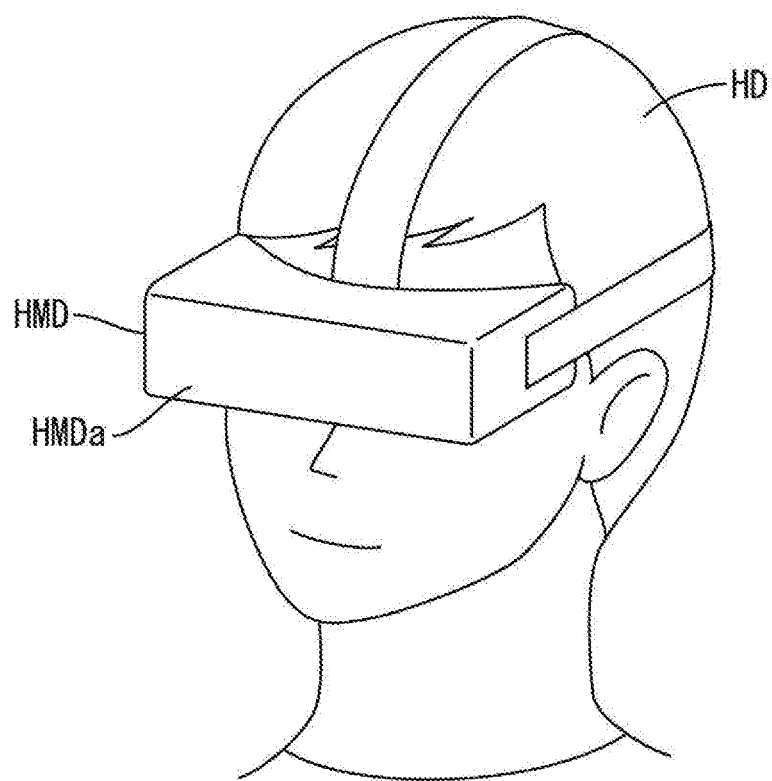
FIG. 1 is a general perspective view illustrating a head-mounted display according to a first embodiment of the present invention that, is mounted on a head of a user.

A first embodiment of the present technology will be described with reference to FIGS. 1 to 6. In this embodiment section, a goggle-type head-mounted display (HMD) HMD and a liquid crystal panel (display device) 10 used therein will be described as an example. X-axis, Y-axis and X-axis may be present in the drawings and each of the axial directions represents a direction represented in each drawing.

Figure 2:
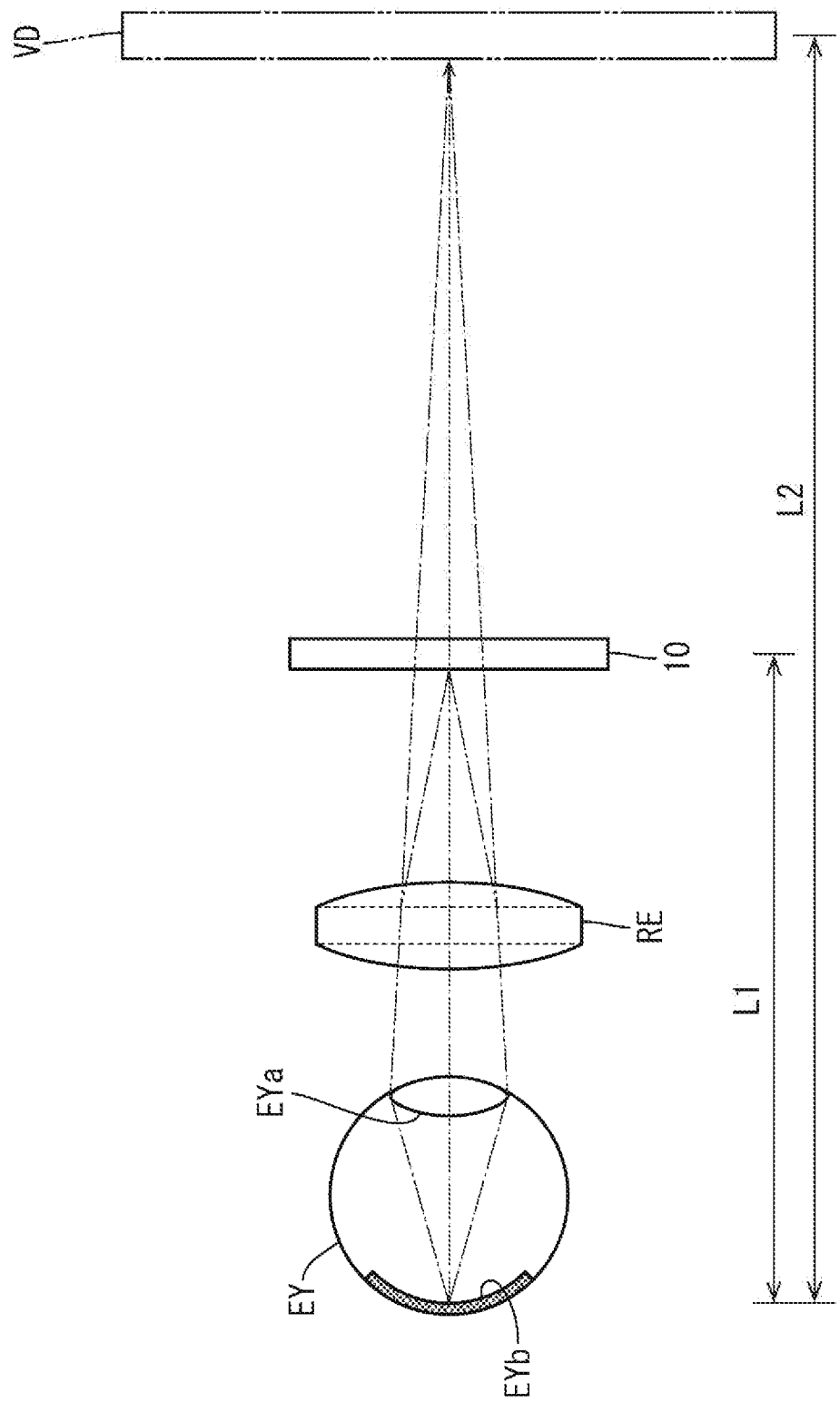
FIG. 2 is a general side view illustrating a liquid crystal panel and a lens included in a head mounting device of the head-mounted display and an eyeball of the user and illustrating an optical relation thereof.

As illustrated in FIG. 1, the goggle-type head-mounted display HMD includes a head mounting device HMDa that is mounted on a head HD of a user to surround two eyes of the user. As illustrated in FIG. 2, the head mounting device HMDa at least includes a built-in liquid crystal panel 10 displaying images thereon and a built-in lens RE with which the images displayed on the liquid crystal panel 10 are formed (imaging) on eyeballs (eyes) EY of the user. The liquid crystal panel 10 displays images thereon with using light from an external light source, which is not illustrated. The lens RE is disposed between the liquid crystal panel 10 and the eyeballs EY of the user and makes the light rays transmitting therethrough to be refracted. By adjusting a focal distance of the lens RE, images formed on the retina (eye) EYb through the crystalline lens EYa of the eyeball EY are seen by a user as if the images are displayed on a virtual display VD that is present in appearance at a position away from the eyeball EY by a distance L2 that is much greater than an actual distance L1 from the eyeball EY to the liquid crystal panel 10. Accordingly, the user sees a magnified image (a virtual image) displayed on the virtual display VD having a screen size (for example, from dozens of inches to several hundred inches) much greater than the screen size (for example, from several numbers of 0.1 inches to several inches) of the liquid crystal panel 10. One liquid crystal panel 10 may be mounted in the liquid crystal panel 10 and images for a right eye and images for a left eye may be displayed on the liquid crystal panel 10. Two liquid crystal panels 10 may be mounted in the head mounting device HMDa and images for a right eye may be displayed on one liquid crystal panel 10 and images for a left eye may be displayed on another liquid crystal panel 10. The head mounting device HMDa may include the above-described external light source and earphone that is put on user's ears and through which sounds are output.

Figure 5:
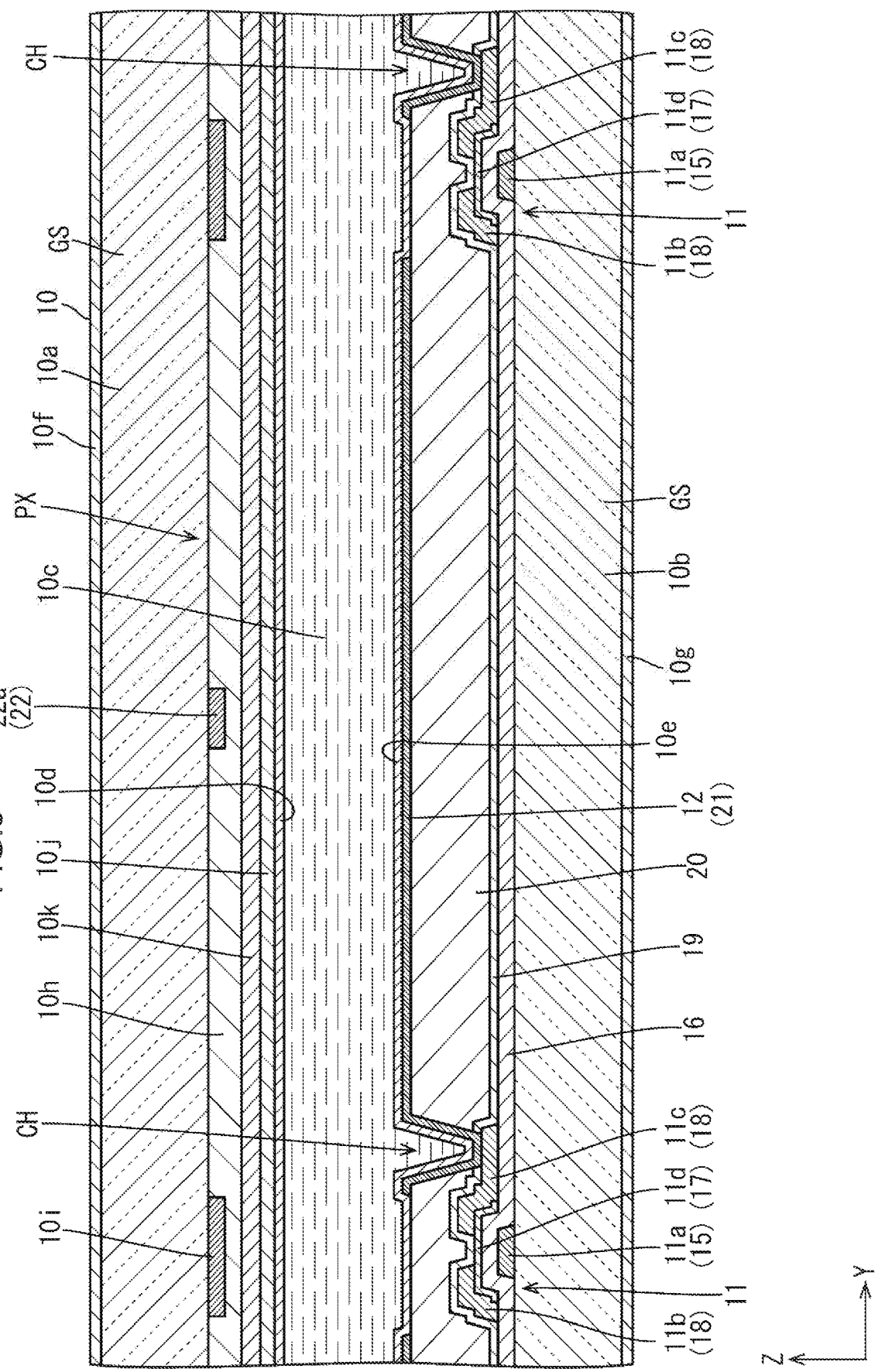
FIG. 5 is a cross-sectional view taken along line A-A in FIG. 3.

A configuration of the liquid crystal panel 10 will be described in detail. As illustrated in FIG. 5, the liquid crystal panel 10 includes a pair, of transparent substrates (highly transmissive) 10a, 10b and a liquid crystal layer 10c between the substrates 10a and 10b. The liquid crystal layer 10c includes liquid crystal molecules having optical characteristics that vary according to application of electric field. The substrates 10a and 10b are bonded with sealing agent, which is not illustrated, while having a cell gap of a thickness of the liquid crystal layer 10c therebetween. Each of the substrates 10a, 10b includes a substantially transparent glass substrate GS and includes multiple films disposed on the glass substrate GS with the known photolithography method. The substrates 10a, 10b include a CF board (a second board, a counter board) 10a on the front (a front surface side) and an array board (a first board, a thin film transistor board, an active matrix board) 10b on the back side (a back surface side). Polarizing plates 10f, 10g are bonded on outer surfaces of the substrates 10a and 10b, respectively. Alignment films 10d, 10e are formed on inner surfaces of the substrates 10a and 10b, respectively, for aligning the liquid crystal molecules included in the liquid crystal layer 10c.

Figure 3:
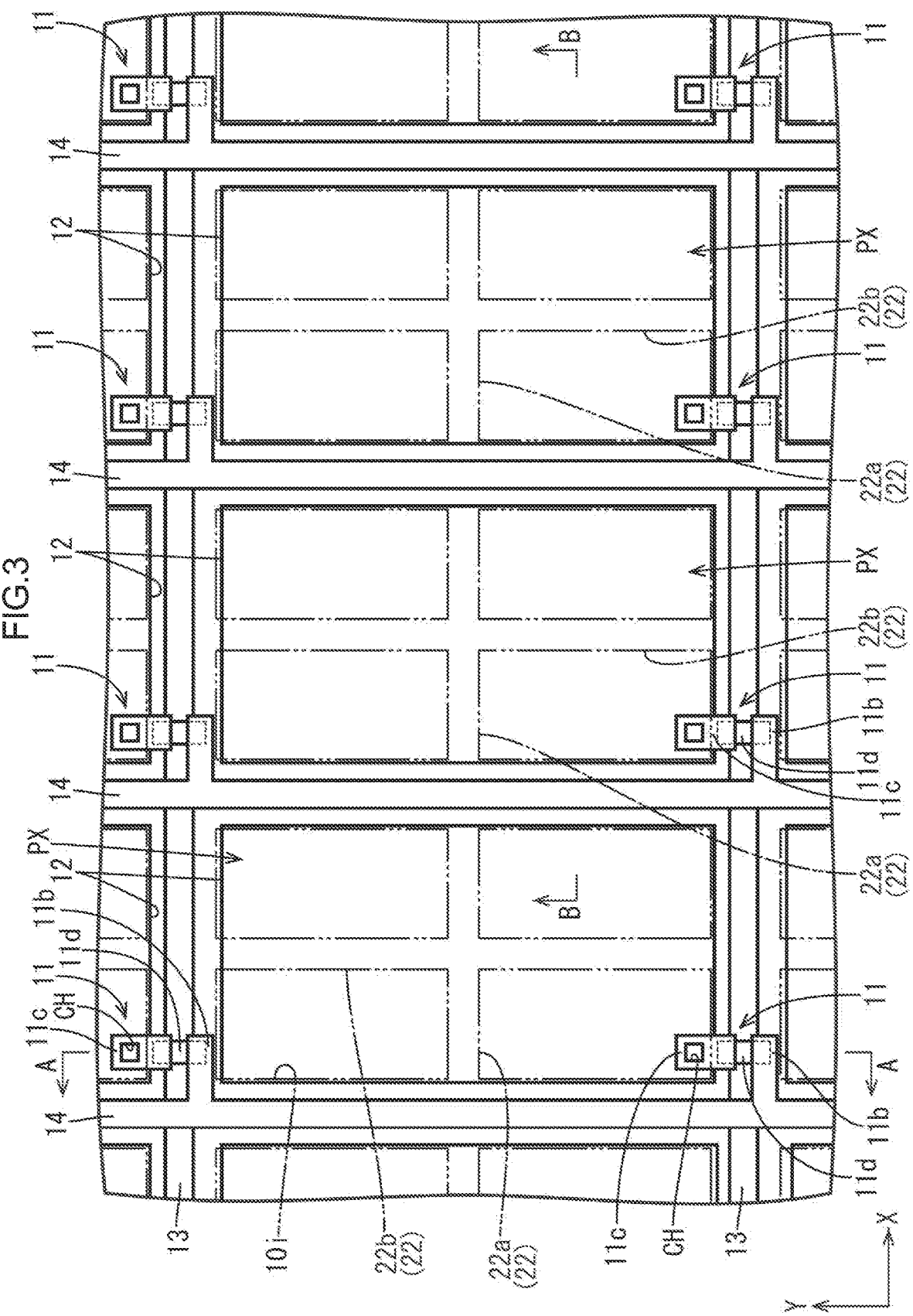
FIG. 3 is a plan view illustrating an array board included in the liquid crystal panel.

As illustrated in FIGS. 3 and 5, a number of TFTs (thin film transistors) 11 that are switching components and a number of pixel electrodes 12 are arranged in a matrix in a display section on the inner surface of the array board 10b (the liquid crystal layer 10c side, the opposed surface side opposed to the CF board 10a). The display section is in a middle of a screen and displays images. Furthermore, gate lines (first lines) 13 and source lines (second lines) 14 are arranged in a grid to surround the TFTs 11 and the pixel electrodes 12. The TFTs 11 and the pixel electrodes 12 are arranged in a grid at intersections of the gate lines 13 and the source lines 14. The pixel electrode 12 has a vertically elongated square (rectangular) shape in a plan view to cover an area surrounded by the gate lines 13 and the source lines 14. The pixel electrode 12 is charged at a predetermined potential (specifically a potential determined by the signal supplied to the source line 14) with the TFT 11. The gate lines 13 and the source lines 14 that have light blocking properties function as a pixel in-between light blocking section that defines each of adjacent pixel sections PX similar to a black matrix 10i, which will be described later. In this embodiment, a forming section in which the gate lines 13 and the source lines 14 are formed substantially matches a non-forming section in which the pixel electrodes 12 are not formed. The non-forming section of the pixel electrodes 12 prevents light from being transmitted therethrough and functions as a light blocking section. Therefore, the non-forming section of the pixel electrodes 12 also functions as the pixel in-between light blocking section that defines each of the adjacent pixel sections PX. Auxiliary capacitance lines (not illustrated) that extend parallel to the gate lines 13 and cross the pixel electrodes 12 may be disposed on the array board 10b.

Figure 4:
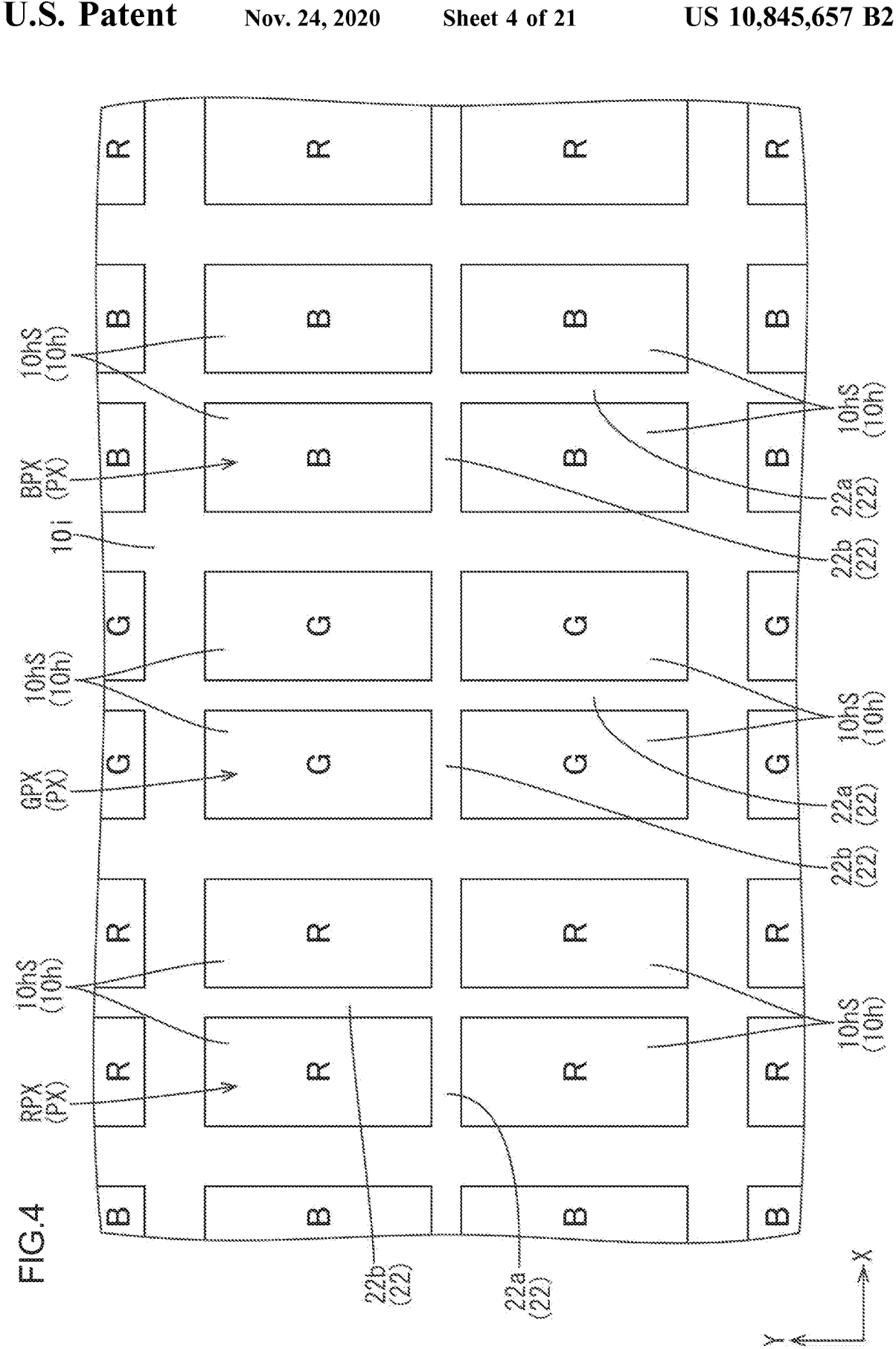
FIG. 4 is a plan view illustrating a CF board included in the liquid crystal panel.
Figure 6:
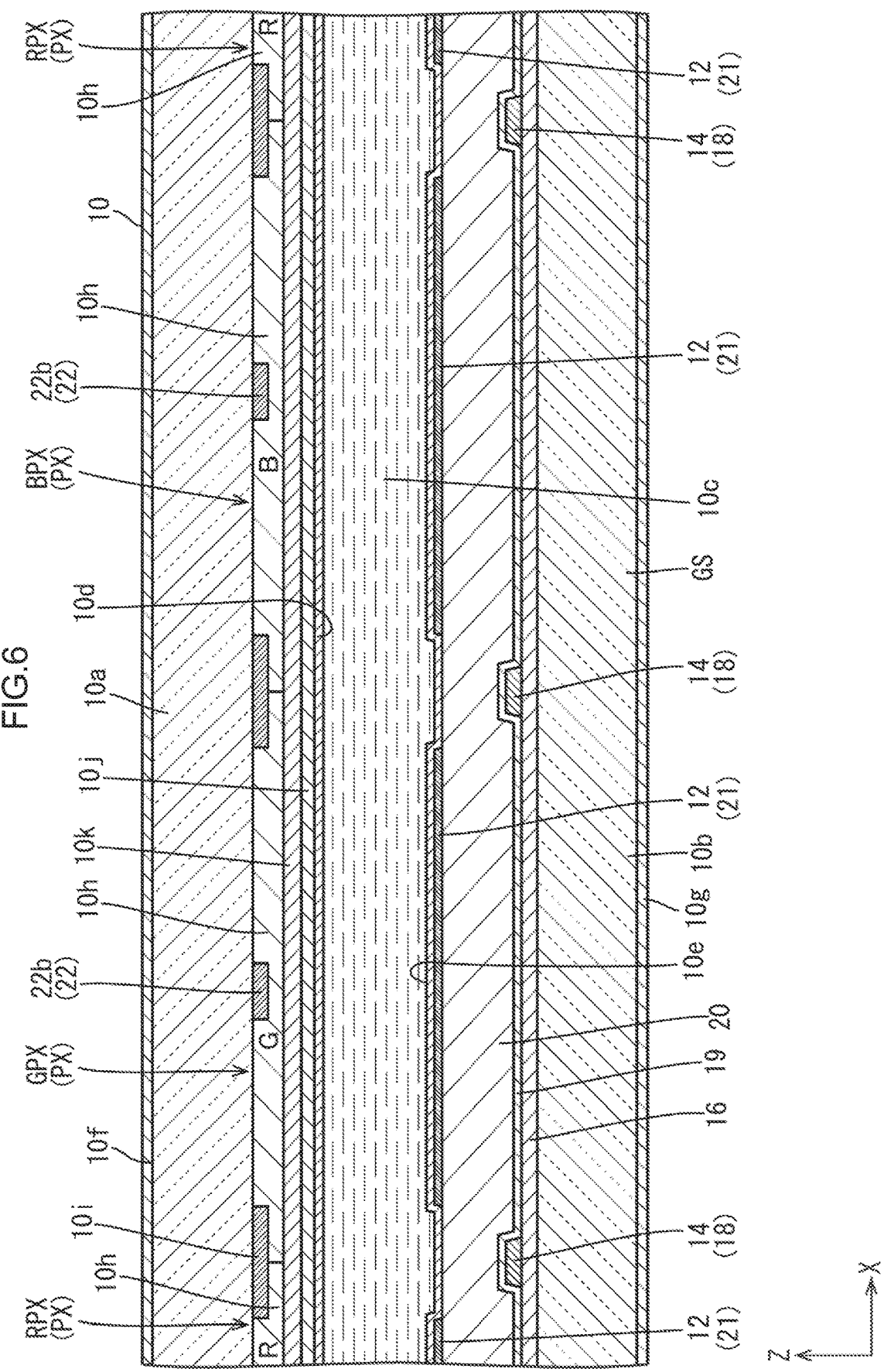
FIG. 6 is a cross-sectional view taken along line B-B in FIG. 3.

As illustrated in FIGS. 4 to 6, color filters (color portions) 10h are formed on an inner surface side (a liquid crystal layer 10c side, a surface side opposite the array board 10b) of the CF board 10a in the display section. The color filters 10h include three color portions of red (R), green (G), and blue (B) color portions. The color filters 10h are arranged in a matrix in a row direction (the X-axis direction) and a column direction (the Y-axis direction). The color filters 10h that are adjacent to each other in the X-axis direction exhibit different colors and the color filters 10h that are adjacent to each other in the Y-axis direction exhibit the same color. The color filters 10h that are arranged in columns and rows overlap the respective pixel electrodes 12 on the array board 10b side in a plan view. The color filter 10h and the pixel electrode 12 that overlap each other form one pixel section PX. The pixel sections PX of three colors include a red pixel section RPX including a red color filter 10h, a green pixel section GPX including a green color filter 10h, and a blue pixel section BPX including a blue color filter 10h. One display pixel is configured with the three pixel sections RPX, GPX, BPX for displaying color images at a certain gradation. The display pixels are arranged on the plate surface of the liquid crystal panel 10 in a repeated sequence along the row direction (the X-axis direction) and form groups of pixels. The groups of pixels are arranged along the column direction (the Y-axis direction). The black matrix (the pixel in-between light blocking section) 10i is formed in a grid and arranged between the color filters 10h for preventing colors from mixing. The black matrix 10i is made of light blocking material (such as titanium (Ti)) and functions as the pixel in-between light blocking section that defines each of the adjacent pixel sections PX. Therefore, each of the pixel sections PX that are adjacent to each other in the X-axis direction and the Y-axis direction and are divided by the black matrix 10i has independency in display. The black matrix 10i overlaps the gate lines 13 and the source lines 14 in a plan view. Each of the color portions of the color filters 10h is thicker than the black matrix 10i and overlaps the black matrix 10i. Portions of the black matrix 10i overlapping the source lines 14 in a plan view (portions extending in the Y-axis direction) are between the color filters 10h exhibiting different colors and mainly exert a function of preventing colors from mixing.

As illustrated in FIG. 4, an overcoat film 10k is disposed over inner surfaces of the color filters 10h and the black matrix 10i. The overcoat film 10k is disposed in a solid pattern over a substantially entire area of the inner surface of the CF board 10a and has a film thickness same as or greater than that of the color filter 10h. A counter electrode 10j is disposed over an inner surface of the overcoat film 10k. The counter electrode 10j is disposed in a solid pattern over a substantially entire area of the inner surface of the CF board 10a. The counter electrode 10j is made of transparent electrode material such as indium tin oxide (ITO). The counter electrode 10j is always maintained at a constant reference potential. If a potential is supplied to each pixel electrode 12 connected to each TFT 11 according to driving of each TFT 11, potential difference is generated between the counter electrode 10j and each pixel electrode 12. Alignment state of the liquid crystal molecules contained in the liquid crystal layer 10c is altered according to the potential difference generated between the counter electrode 10j and each pixel electrode 12. Accordingly, polarization of the transmission light is altered. Thus, the transmission light amount of the liquid crystal panel 10 is controlled for every display pixel section PX independently and a predetermined color image can appear on the display panel.

The various films formed in layers on the inner surface of the array board 10b will be described. As illustrated in FIG. 4, on the array board 10b, the following films are formed in the following order from the lowest layer (the grass substrate GS): a first metal film (a gate metal film) 15, a gate insulation film (an insulation film) 16, a semiconductor film 17, a second metal film (a source metal film) 18, an interlayer insulation film 19, a flattening film 20, and a transparent electrode film 21. The alignment film 10e that is disposed on an upper layer with respect to the transparent electrode film 21 is not illustrated in FIG. 4.

The first metal film 15 is a multilayer film including two layers of metal material such as a tungsten (W) layer and a tantalum nitride (TaN) layer. The first metal film 15 mainly forms the gate lines 13. As illustrated in FIG. 5, the gate insulation film 16 is included in an upper layer of the first metal film 15. The gate insulation film 16 is a multilayer film including layers of inorganic material such as a silicon oxide ($SiO_2$) layer and a silicon nitride ($SiN_x$) layer. The gate insulation film 16 is disposed between the first metal film 15 (such as the gate lines 13) and the second metal film 18 (such as the source lines 14), which will be described later, and the metal films are insulated from each other by the gate insulation film 16. The semiconductor film 17 is included in an upper layer of the gate insulation film 16 and is an oxide semiconductor thin film. The TFT 11 including such an oxide semiconductor film 17 has high electron mobility (higher than that of an a-SiTFT, for example, 20 times higher or more) and low leakage current (less than 1/100 compared to that of an a-SiTFT).

As illustrated in FIG. 5, the second metal film 18 is included in an upper layer of the oxide semiconductor film 17. The second metal film 18 is a multilayer film including three metal layers such as a titanium (Ti) layer, an aluminum (Al) layer, and a titanium layer. The second metal film 18 mainly forms the source lines 14. The interlayer insulation film 19 is at least above the second metal film 18. The interlayer insulation film 19 is made of inorganic material such as silicon oxide ($SiO_2$). The flattening film 20 is disposed on the interlayer insulation film 19. The flattening film 20 is made of organic material such as acrylic resin (PMMA). The flattening film 20 has a film thickness greater than that of the interlayer insulation film 19. Therefore, the surface of the array board 10b is flattened. The interlayer insulation film 19 and the flattening film 20 are present between the transparent electrode film 21 and each of the second metal film 18 and the oxide semiconductor film 17 and insulation is established therebetween. The transparent electrode film 21 is included in an upper layer of the flattening film 20. The transparent electrode film 21 is made of transparent electrode material such as indium zinc oxide (IZO). The transparent electrode film 21 mainly forms the pixel electrode 12.

A configuration of each TFT 11 will be described in detail. As illustrated in FIGS. 3 and 5, each TFT 11 at least includes a gate electrode 11a, a channel section 11d, a source electrode 11b that is connected to one end of the channel section 11d, and a drain electrode 11c that is connected to another end of the channel section 11d. The gate electrode 11a is formed from the first metal film 15 that forms the gate lines 13 and is a part of the gate lines 13 (overlapping the channel section 11d). The channel section 11d is formed from the semiconductor film 17 and extends in the Y-axis direction while crossing the gate electrode 11a. The channel section 11d overlaps the gate electrode 11a while having the gate insulation film 16 therebetween. The source electrode 11b is formed from the second metal film 18 that forms the source line 14 and is included in an upper layer of the semiconductor film 17. The source electrode 11b is a branched section projecting and branched from the source line 14 in the X-axis direction (the extending direction of the gate line 13) and a part of the source electrode 11b overlaps the gate electrode 11a. The drain electrode 11c is formed from the second metal film 13 that forms the source line 14 and the source electrode 11b and is included in an upper layer side of the semiconductor film 17. The drain electrode 11c is opposite the source electrode 11b while having a distance of the channel section 11d therebetween. An end of the drain electrode 11c opposite from the channel section 11d side is connected to the pixel electrode 12 through a contact hole CH formed in the interlayer insulation film 19 and the flattening film 20. In this embodiment, the TFT 11 does not include an etch stopping layer on the channel section 11d and is configured such that a lower surface of the end of the source electrode 11b on the channel section 11d side is contacted with an upper surface of the oxide semiconductor film 17.

As illustrated in FIG. 2, the images displayed on the liquid crystal panel 10 are seen by the user as magnified images with the head-mounted display HMD according to this embodiment. Therefore, the black matrix 10i defining the pixel sections PX is likely to be recognized as a mesh-shaped black display section. Definition of the original image (image before being magnified) displayed on the liquid crystal panel 10 may be increased such that the mesh-shaped black display section is less likely to be recognized. However, in the head-mounted display HMD, the user may feel sick if an afterimage or delay is caused in the images displayed on the liquid crystal panel 10. Therefore, the head-mounted display HMD has a refresh rate of 90 Hz or 120 Hz that, is higher than general refresh rate of 60 Hz of liquid crystal panels for other usages (such as television devices, tablet-type terminals, or smartphones). If the definition of the liquid crystal panel 10 of the head mounted display HMD is simply increased, the load caused by the imaging process is increased. In the head-mounted display HMD, an advanced imaging process may be performed. For example, operations of the user may be supplemented with various kinds of sensors and the images to be displayed are corrected according to the supplemented operations. If the definition of the liquid crystal panel 10 is simply increased in such an advanced imaging process, the load caused by the imaging process may be further increased.

As illustrated in FIGS. 3 and 4, the liquid crystal panel 10 of this embodiment, includes divisional light blocking sections 22 that divide the pixel sections PX into multiple divided pixels PPX. In FIG. 3, outlines of the divisional light blocking sections 22 and the black matrix 10i are illustrated, with two-dot chain lines. Specifically, the divisional light blocking section 22 has a substantially cross shape in a plan view and divides the pixel section PX into four divided pixels PPX. The divisional light blocking section 22 includes a gate line parallel section (a first line parallel section, a short-side section) 22a that extends linearly along the X-axis direction, that is, an extending direction of the gate lines 13 and a source line parallel section (a second line parallel section, a long-side section) 22b that extends linearly along the Y-axis direction, that is, an extending direction of the source lines 14. The gate line parallel section 22a crosses the pixel section PX at a middle with respect to the Y-axis direction and the source line parallel section 22b crosses the pixel section PX at a middle with respect to the X-axis direction. The gate line parallel section 22a is shorter than the source line parallel section 22b. A ratio of a length dimension of the gate line parallel section 22a and a length dimension of the source line parallel section 22b is substantially equal to a ratio of a short-side dimension and a long-side dimension of the pixel section PX. Thus, the pixel section PX is equally divided into four divided pixels PPX by the divisional light blocking section 22. Each of the four divided pixels PPX obtained by equally dividing the pixel section PX with the divisional light blocking section 22 has a vertically elongated square plan view shape. A ratio of the short-side dimension and the long-side dimension of the divided pixel PPX is substantially equal to the ratio of the short-side dimension and the long-side dimension of the pixel section PX. Namely, the divided pixel PPX has a shape similar to that of the pixel section PX in a plan view. The gate line parallel section 22a and the source line parallel section 22b of the divisional light blocking section 22 have a substantially same width. However, the gate line parallel section 22a and the source line parallel section 22b have a width smaller than that of the black matrix 10i and are relatively narrower than the black matrix 10i.

As illustrated in FIGS. 5 and 6, the divisional light blocking sections 22 are included on the CF board 10a side among the pair of substrates 10a, 10b of the liquid crystal panel 10 and are included in the same layer as the black matrix 10i that defines each of the adjacent color filters 10h. Namely, the divisional light blocking section 22 is formed from the light blocking material same as the black matrix 10i is. Ends of the gate line parallel section 22a and ends of the source line parallel section 22b with respect to the length dimension thereof are continuous from the black matrix 10i. The color filter 10h is divided into four divided color filters 10hS that exhibit the same color by the divisional light blocking section 22. Each of the four divided color filters 10hS configures the divided pixel PPX. The four divided pixels PPX included in one pixel section PX are defined by the divisional light, blocking section 22 and are driven by the same TFT 11 that is connected to the pixel electrode 12 of the pixel section PX at a same gradation.

The pixel section PX is divided into the four divided pixels PPX by the divisional light blocking section 22 such that the definition of the liquid crystal panel 10 is falsely improved. Namely, the four divided pixels PPX are likely to be recognized by a user as the pseudo pixel sections and the user feels the definition is improved as twice. Specifically, if the actual definition of the liquid crystal panel 10 is about the full high definition (FHD: 1920×1080), images on the liquid crystal panel 10 can be recognized by the user falsely at the definition of 4K2K (3840×2160). Therefore, if images displayed on the liquid crystal panel 10 are seen by the user of the head-mounted display HMD as magnified images, the black matrix 10*i* defining each of the adjacent pixel sections PX is less likely to be seen. The black matrix 10*i* is less likely to be seen as the black display section between the adjacent pixel sections PX. The display quality can be improved without increasing the actual definition of the liquid crystal panel 10. Especially in the configuration including only one liquid crystal panel 10 in the head-mounted display HMD, the definition of the liquid crystal panel 10 for each eye is lowered to a half of the definition of the liquid crystal panel 10. Therefore, the configuration of this embodiment is quite effective for such a configuration.

Furthermore, the divisional light blocking section 22 is included in the same layer as the black matrix 10*i* on the CF board 10*a* and the divisional light blocking sections 22 are included on the CF board 10*a*. According to such a configuration, an array board having a conventional configuration can be used as the array board 10*b* and a manufacturing cost is reduced. The aperture ratio of the pixel section PX may be lowered due to the arrangement of the divisional light blocking sections 22. However, the divisional light blocking section 22 is narrower than the black matrix 10*i* and therefore, the aperture ratio of the pixel section PX is less likely to be lowered and pseudo definition improvement is effectively achieved. Furthermore, the divisional light blocking section 22 divides the pixel section PX such that the four divided pixels PPX are obtained and the divided pixel PPX has a shape similar to that of the pixel section PX. Therefore, the pseudo definition improvement is further effectively obtained with the divisional light blocking sections 22 and the display quality is further improved.

As is described before, the liquid crystal panel (the display device) 10 of this embodiment includes the pixel sections PX, the black matrix (the pixel in-between light blocking section) 10*i* that is included to define each of the adjacent pixel sections PX, the TFTs (switching components) 11 connected to the respective pixel sections PX and configured to drive the respective pixel sections PX, and the divisional light blocking section 22 arranged to define the pixel section PX into multiple divided pixels PPX.

According to such a configuration, each of the pixel sections PX is driven independently by each of the TFTs 11 connected to the corresponding pixel section PX such that a certain image is displayed. The adjacent pixel sections PX are divided by the black matrix 10*i* and the display operation with each pixel section PX is surely independent. The pixel section PX is divided into divided pixels PPX by the divisional light blocking section 22 and therefore, the definition of the liquid crystal panel 10 is falsely improved and the black matrix 10*i* is less likely to be seen. Therefore, the black matrix 10*i* is less likely to be seen as the black display section between the adjacent pixel sections PX and display quality is improved.

The liquid crystal panel 10 includes the array board (the first board) 10*b* and the CF board (the second board) 10*a*, and the array board 10*b* at least, includes the pixel electrodes 12 of the pixel sections PX and the TFTs 11, and the CF board 10*a* at least includes the color filters (the color portions) 10*h* of the pixel sections PX and the black matrix 10*i*. The divisional light blocking sections 22 are included in the same layer as the black matrix 10*i*. According to such a configuration, the pixel electrodes 12 of the respective pixel sections PX are charged at a certain potential with the TFTs 11. The amount of transmission rays of light transmitting through the color filter 10*h* of each pixel section PX is controlled based on the potential of each pixel electrode 12 such that display operation is performed in each of the pixel sections PX at a certain gradation. The divisional light blocking sections 22 are included in the same layer as the black matrix 10*i* on the CF board 10*a* and the divisional light blocking sections 22 are included on the CF board 10*a*. Therefore, an array board of a conventional configuration can be used as the array board 10*b*.

The divisional light blocking section 22 is narrower than the black matrix 10*i*. According to such a configuration, lowering of the aperture rate of the pixel section PX due to the divisional light blocking section 22 is less likely to be caused and the pseudo definition improvement is effectively obtained.

The pixel section PX has a square plan view shape and the divisional light blocking section 22 divides the pixel section PX into four divided pixels PPX such that each divided pixel PPX has a shape similar to that of the pixel section PX. According to such a configuration, the pseudo definition improvement obtained by the divisional light blocking sections 22 is effectively obtained and the display quality is further improved.

The head-mounted display HMD of this embodiment at least includes the above-described liquid crystal panel 10, the lens RE through which the image displayed on the liquid crystal panel 10 is formed on the eyeball (eye) of the user, and the head mounting device HMDa including the liquid crystal panel 10 and the lens RE and mounted on the user's head HD. According to the head-mounted display HMD of such a configuration, if the user uses the head mounting device HMDa mounted on the head HD, the image displayed on the liquid crystal panel 10 is formed on the user's eyeball EY through the lens RE and the user can see the image displayed on the liquid crystal panel 10 as a magnified image. If the user sees the image displayed on the liquid crystal panel 10 as a magnified image, the black matrix 10*i* is likely to be seen as the black display section. However, the pixel section PX is divided into multiple divided pixels PPX with the divisional light blocking section 22 such that the black matrix 10*i* is less likely to be seen and the black matrix 10*i* is less likely to be seen as the black display section and good display quality can be obtained.

Second Embodiment

Next, a second embodiment of the present invention will be described with reference to FIGS. 7 to 10. In the second embodiment, arrangement and a configuration of a divisional light blocking section 122 are altered from those of the first embodiment. Similar configurations, operations, and effects as those of the first embodiment will not be described.

Figure 7:
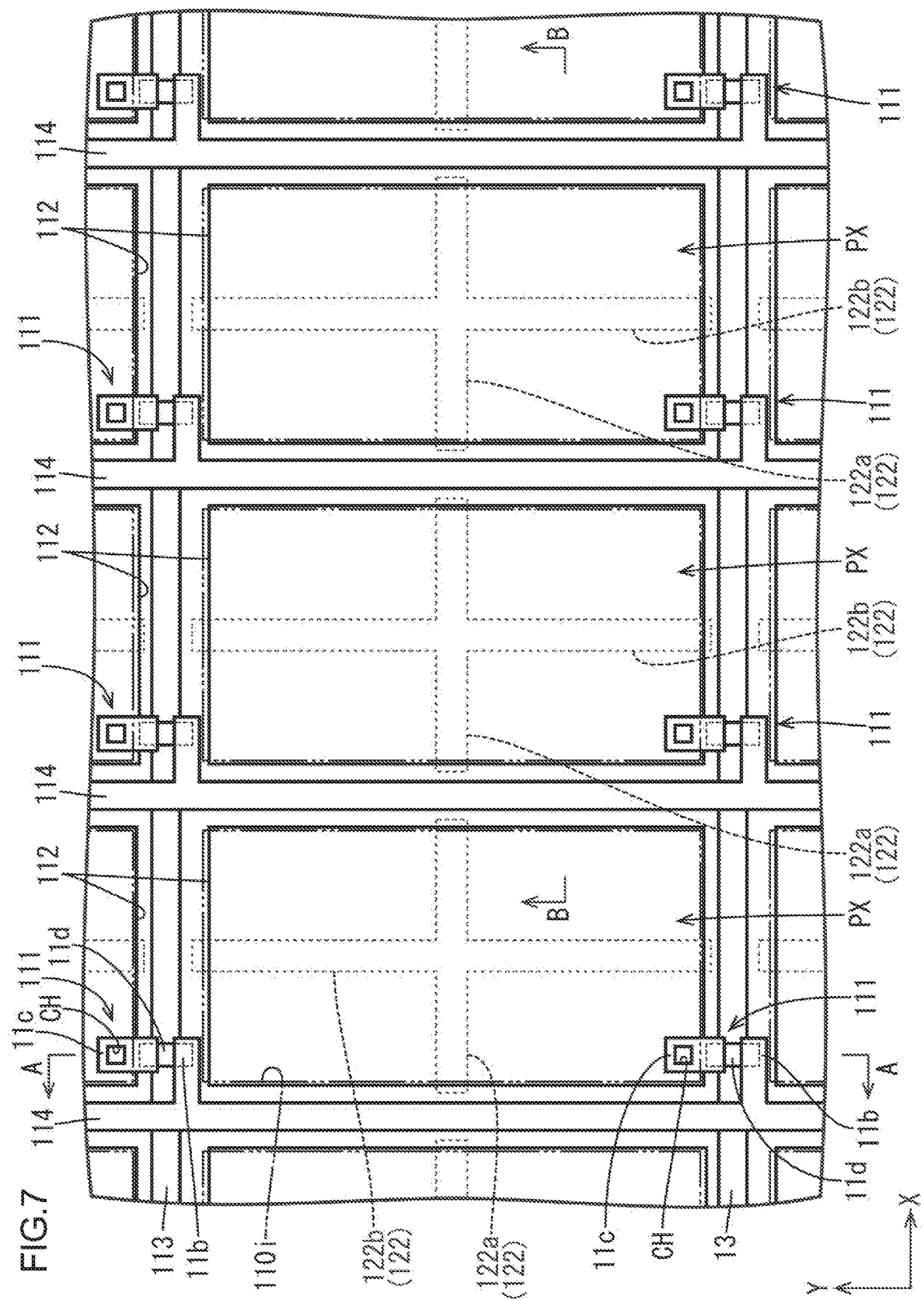
FIG. 7 is a plan view illustrating an array board included in a liquid crystal panel according to a second embodiment of the present invention.
Figure 8:
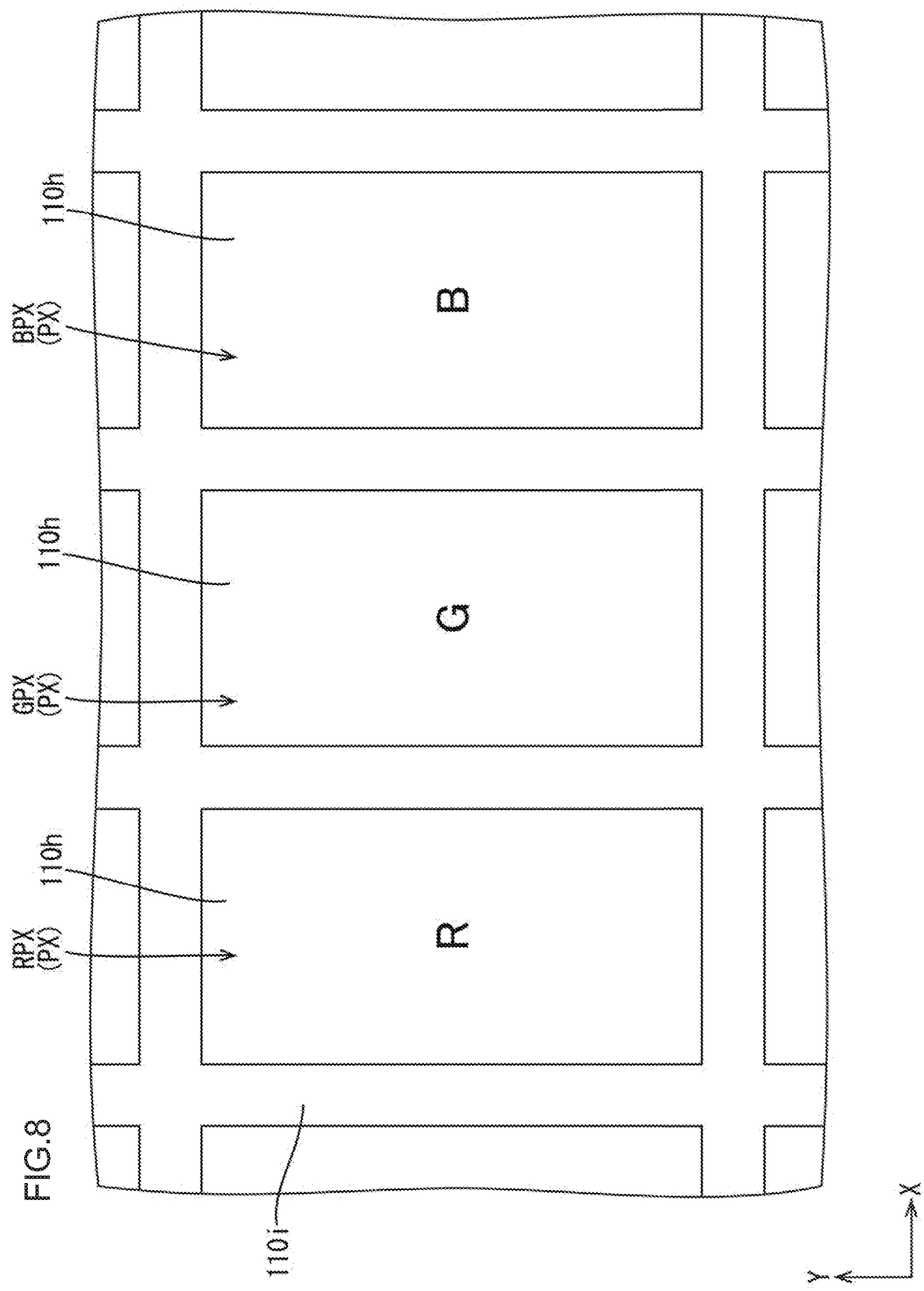
FIG. 8 is a plan view illustrating a CF board included in the liquid crystal panel.
Figure 9:
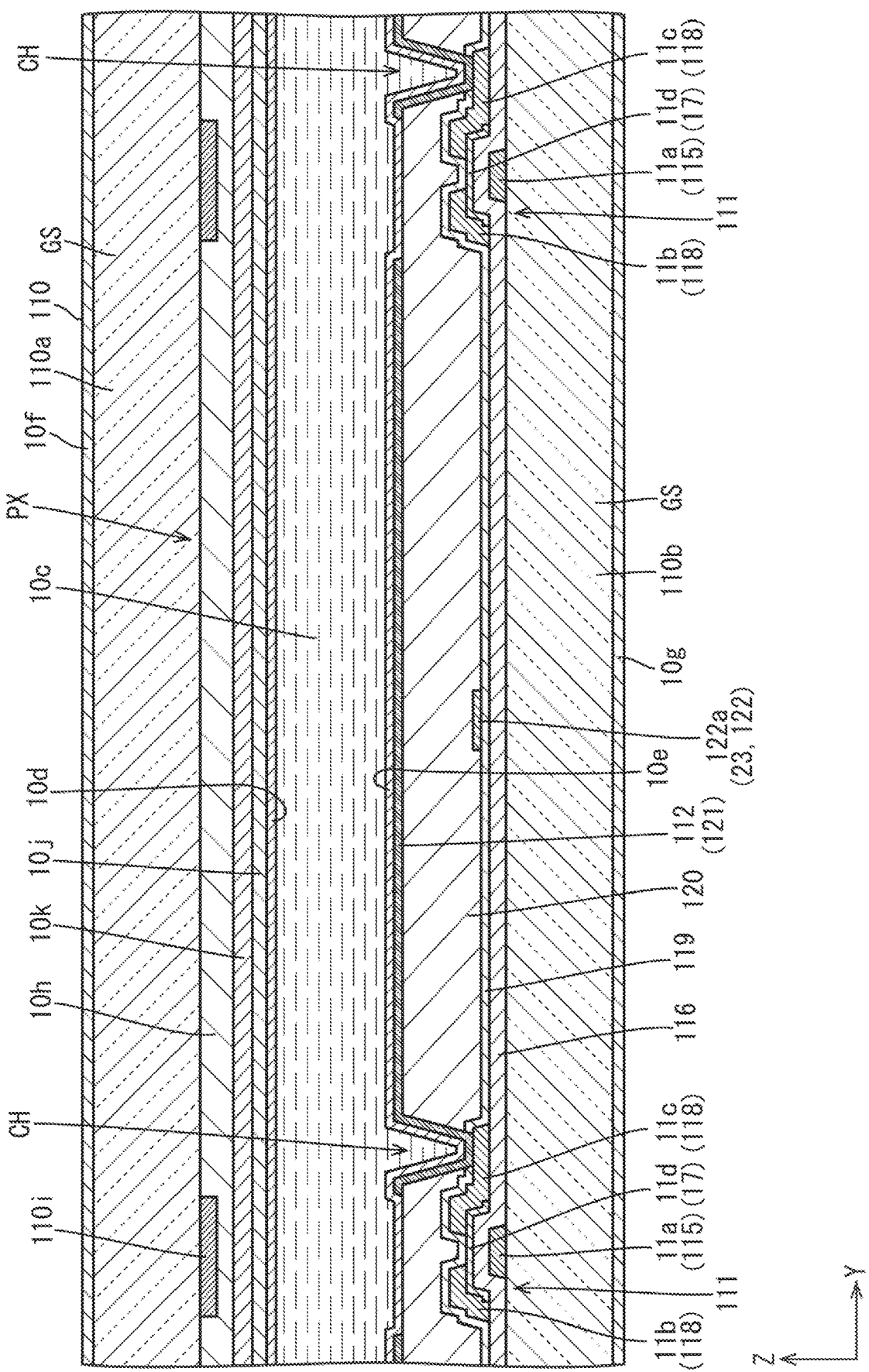
FIG. 9 is a cross-sectional view taken along line A-A in FIG. 7.
Figure 10:
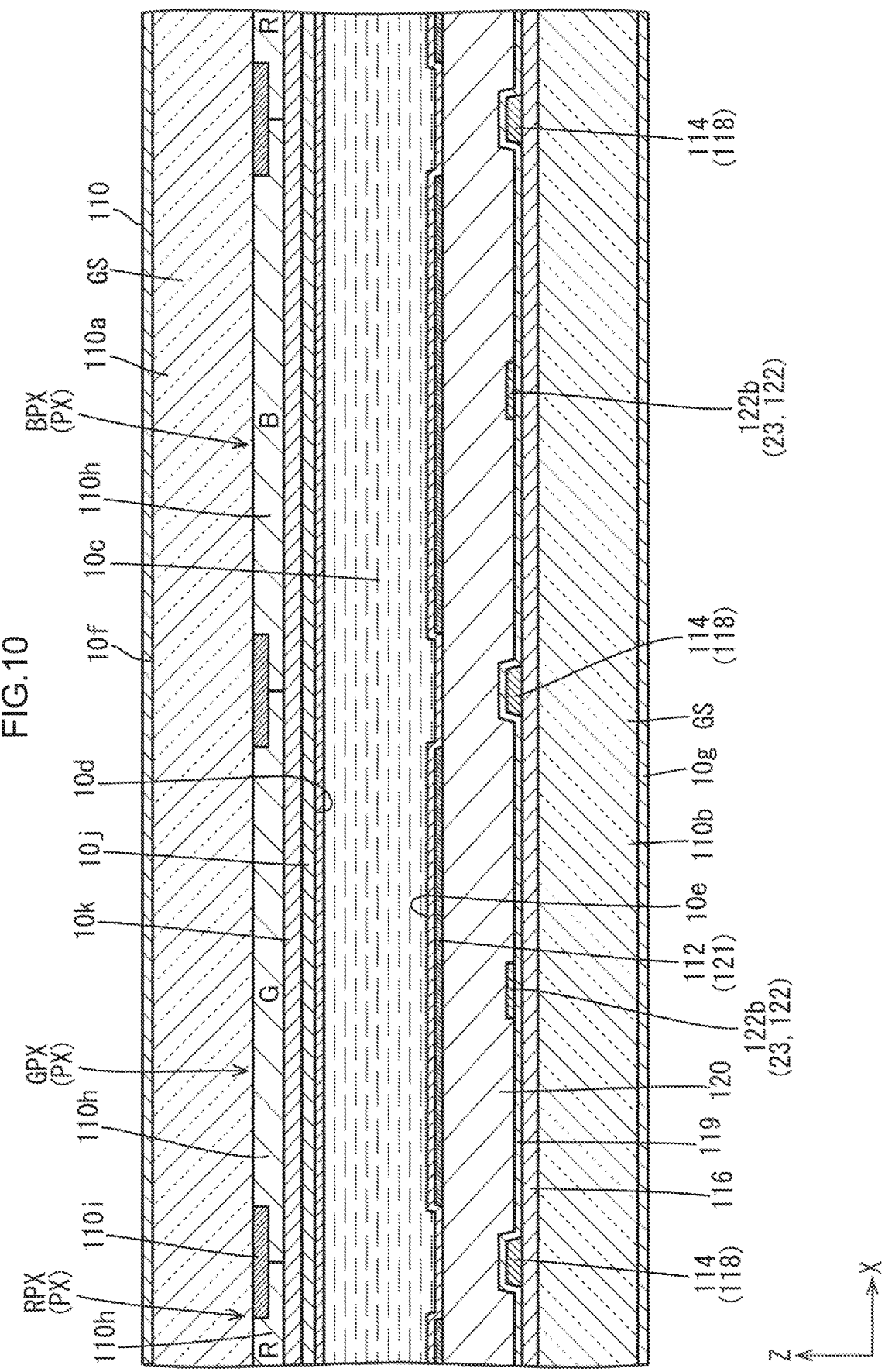
FIG. 10 is a cross-sectional view taken along line B-B in FIG. 7.

As illustrated in FIGS. 7 and 8, the divisional light blocking sections 122 of this embodiment are included on an array board 110*b* side of a pair of substrates 110*a*, 110*b* included in a liquid crystal panel 110. In FIG. 7, outlines of the divisional light blocking sections 122 are illustrated with broken lines. Specifically, as illustrated in FIGS. 9 and 10, the divisional light blocking sections 122 are formed form the third metal film 23 that is disposed between an interlayer insulation film 119 and a flattening film 120 of the array board 110b. The third metal film 23 is made of conductive material having light blocking properties and is included in a layer different from, a first metal film 115 forming gate lines 113 and a second metal film 118 forming source lines 114. The third metal film 23 is insulated from the second metal film 118 by the interlayer insulation film 119 disposed therebetween and is insulated from a transparent electrode film 121 that forms pixel electrodes 112 by the flattening film 120 disposed therebetween. The material of the third metal film 23 is preferably same as that, of the first metal film 115 or the second metal film 118 for reducing a cost for the material. However, the material of the third metal film 23 may not be necessarily same as that of the first metal film 115 or the second metal film 118. As illustrated in FIG. 7, the divisional light blocking section 122 partially overlaps a black matrix 110i and does not overlap the gate lines 113 and the source lines 114. Specifically, the divisional light blocking section 122 includes a gate line parallel section 122a and a source line parallel section 122b and ends of the gate line parallel section 122a and ends of the source line parallel section 122b with respect to the longitudinal direction overlap the black matrix 110i. The divisional light blocking section 122 is disposed such that the ends of the gate line parallel section 122a with respect to the longitudinal direction are spaced from the source lines 114 in a plan view and the ends of the source line parallel section 122b with respect to the longitudinal direction are spaced from the gate lines 113 in a plan view.

In this embodiment, the divisional light blocking sections 122 are disposed on the array board 110b and therefore, a CF board having the conventional structure can be used as the CF board 110a. According to such a configuration, the manufacturing cost can be reduced, furthermore, the divisional light blocking sections 122 are formed from the third metal film 23 that is different from the first metal film 115 and the second metal film 118. Therefore, in producing the liquid crystal panel 110, the divisional light blocking sections 122 can be formed in a process different from the processes of forming the gate lines 113 and the source lines 114. A device used in the process of forming the divisional light blocking sections 122 is different from a device used in the process of forming the gate lines 113 and the source lines 114. Therefore, there is less restriction required in forming the divisional light blocking sections 122. Furthermore, according to the configuration that the divisional light blocking section 122 partially overlaps the black matrix 110i, the pseudo definition improvement is effectively obtained. The divisional light blocking sections 122 that are made of conductive material do not overlap the gate lines 113 and the source lines 114. According to such a configuration, the parasitic capacitance is less likely to be generated between the divisional light blocking sections 122 and each of the gate lines 113 and the source lines 114. Accordingly, delay is less likely to be caused in signals transmitted to the gate lines 113 and the source lines 114. The divisional light blocking sections 122 are disposed on the array board 110b and accordingly, color filters 110h of the CF board 110a are not divided as illustrated in FIG. 8.

As described above, this embodiment includes the array board 110b and the CF board 110a, and the array board 110b at least includes the pixel electrodes 112 of the pixel section PX and the TFTs 111, and the CF board 110a at least includes the color filters 110h of the pixel sections PX and the black matrix 110i. The divisional light blocking sections 122 are included on the array board 110b. According to such a configuration, the pixel electrodes 112 of the pixel sections PX are charged at the predetermined potential with the TFTs 111. The amount, of transmission rays of light transmitting through the color filter 110h of each pixel section PX is controlled based on the potential of each pixel electrode 112 such that display operation is performed in each of the pixel sections PX at a certain gradation. The divisional light blocking sections 122 are disposed on the array board 110b and therefore, a CF board having the conventional structure can be used as the CF board 110a.

The array board 110b at least includes the first metal film 115, the gate insulation film (the insulation film) 116 included in an upper layer of the first metal film 115, the second metal film 118 included in an upper layer of the gate insulation film 116, the gate lines (the first lines) 113 connected to the TFTs 111 and formed from the first metal film 115, and the source lines (the second lines) 114 that cross the gate lines 113 and are connected to the TFTs 111 and formed from the second metal film 118. The divisional light blocking sections 122 partially overlap the black matrix 110i and do not overlap the gate lines 113 and the source lines 114. According to the configuration that the divisional light blocking section 122 partially overlaps the black matrix 110i, the pseudo definition improvement is effectively obtained. The divisional light blocking sections 122 that are made of conductive material do not overlap the gate lines 113 and the source lines 114. According to such a configuration, the parasitic capacitance is less likely to be generated between the divisional light blocking sections 122 and each of the gate lines 113 and the source lines 114. Accordingly, delay is less likely to be caused in signals transmitted to the gate lines 113 and the source lines 114.

The array board 110b at least includes the third metal film 23 included in a different layer from the first metal film 115 and the second metal film 118, and the divided light locking sections 122 are formed from the third metal film 23. Therefore, in producing the liquid crystal panel 110, the divisional light blocking sections 122 can be formed in a process different from the processes of forming the gate lines 113 and the source lines 114. A device used in the process of forming the divisional light blocking sections 122 is different from a device used in the process of forming the gate lines 113 and the source lines 114. Therefore, less restriction required in forming the divisional light blocking sections 122.

Third Embodiment

Next, a third embodiment of the present invention will be described with reference to FIGS. 11 to 13. In the third embodiment, arrangement and a configuration of a divisional light blocking section 222 are altered from those of the second embodiment. Similar configurations, operations, and effects as those of the second embodiment will not be described.

Figure 11:
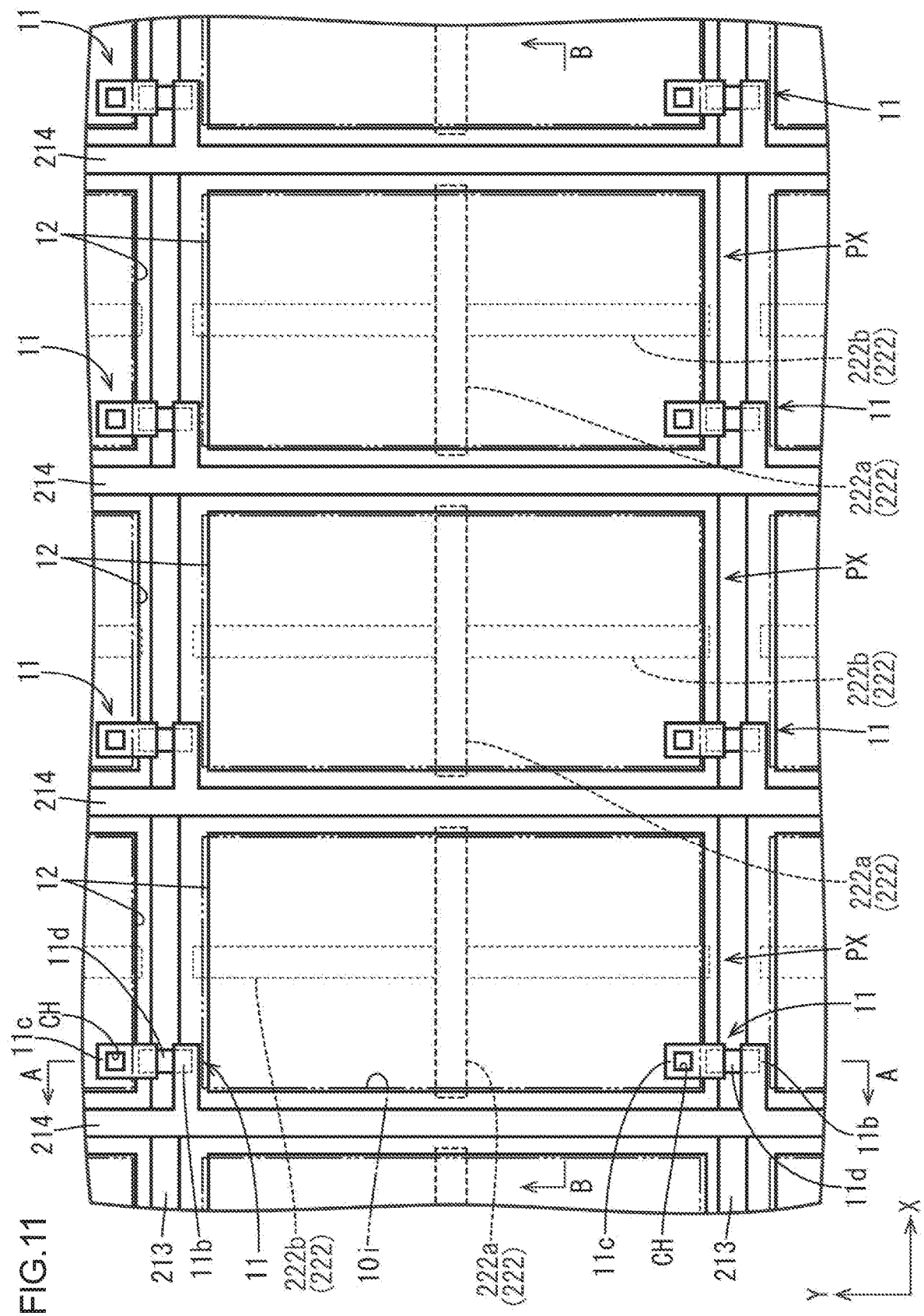
FIG. 11 is a plan view illustrating an array board included in a liquid crystal panel according to a third embodiment of the present invention.
Figure 12:
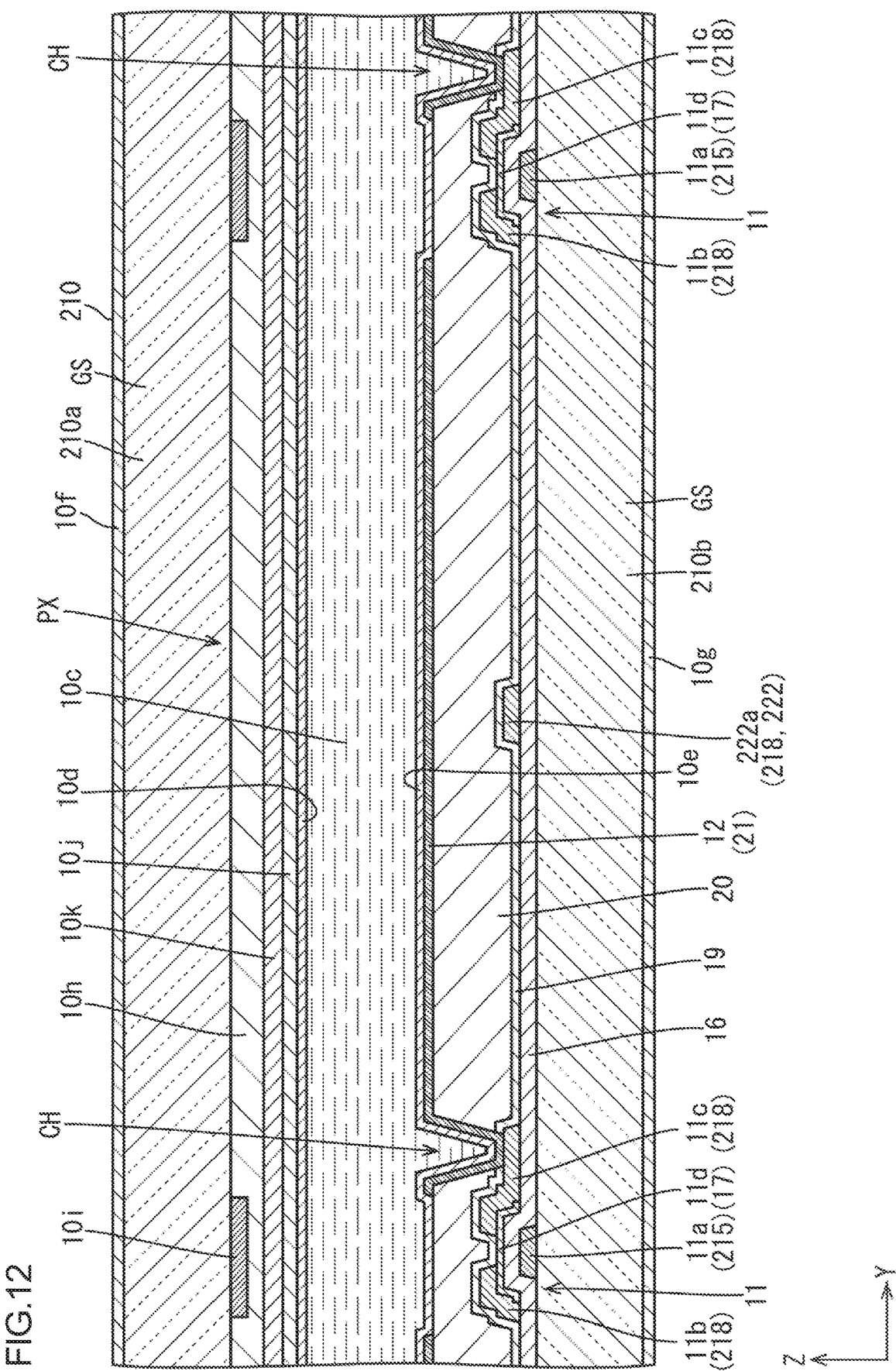
FIG. 12 is a cross-sectional view taken along line A-A in FIG. 11.
Figure 13:
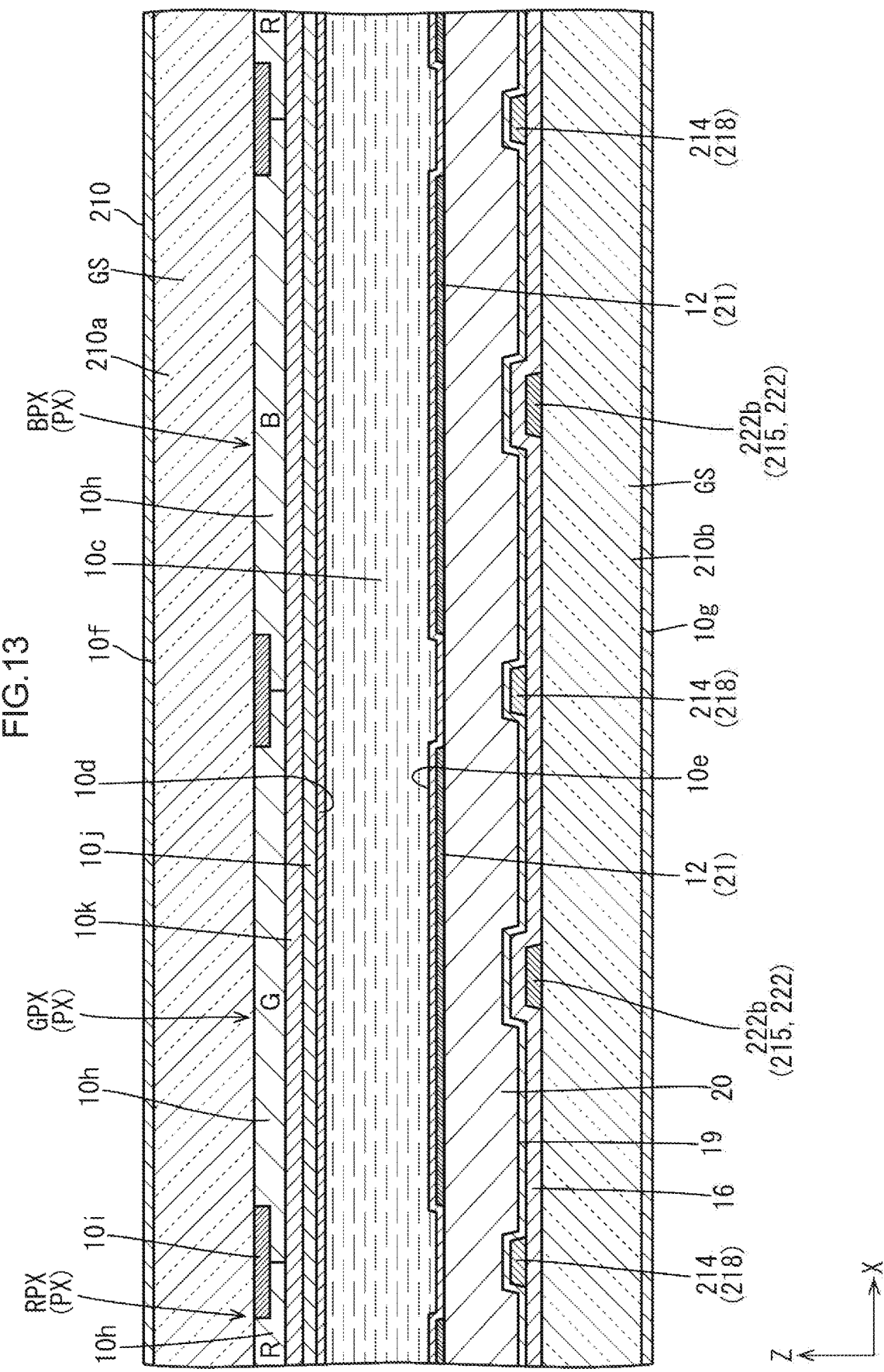
FIG. 13 is a cross-sectional view taken along line B-B in FIG. 11.

As illustrated in FIGS. 11 to 13, the divisional light blocking sections 222 are included on an array board 210b and formed from a first metal film 215 and a second metal film 218. Specifically, gate line parallel sections 222a of the divisional light blocking section 222 are formed from the second metal film 218 and source line parallel section 222b are formed from the first metal film 215. Namely, the gate line parallel sections 222a, are not formed from a metal film forming the gate lines 213 that are parallel to the gate line parallel sections 222a but formed from the second metal film 216 forming the source lines 214 that are perpendicular to the gate line parallel sections 222a. The gate lines 213 and the source line parallel sections 222b are included in the same layer and the source lines 214 and the gate line parallel sections 222a are included in the same layer. In FIG. 11, the outlines of the gate line parallel sections 222a of the divisional light blocking sections 222 are illustrated with relatively thick broken lines and the outlines of the source line parallel sections 222b are illustrated with relatively thin broken lines. A configuration of a CF board 210a of this embodiment is similar to that of the second embodiment and is not illustrated with a plan view.

Thus, the divisional light blocking sections 222 are formed from the first metal film 215 and the second metal film 218. According to such a configuration, in producing the array board 210b of the liquid crystal panel 210, the divisional light blocking sections 222 can be formed in the process of forming the gate lines 213 and the source lines 214. Accordingly, a device exclusive for forming the divisional light blocking sections 222 is not necessary and a manufacturing cost is preferably reduced. Furthermore, the gate line parallel section 222a that is formed from the second metal film 218 is less likely to cause any restriction in designing intervals between adjacent gate lines 213. Similarly, the source line parallel section 222b that is formed from the first metal film 215 is less likely to cause any restriction in designing intervals between adjacent source lines 214.

As described before, according to this embodiment, the divisional light blocking sections 222 are formed from one of the first metal film 215 and the second metal film 218. According to such a configuration, in producing the liquid crystal panel 210, the divisional light blocking sections 222 can be formed in the process of forming the gate lines 213 or the source lines 214. Therefore, a device exclusive for forming the divisional light blocking sections 222 is not necessary and a manufacturing cost can be preferably reduced.

The divisional light blocking section 222 includes the gate line parallel section (the first line parallel section) 222a that extends in an extending direction of the gate lines 213 and is formed from the second metal film 218 and the source line parallel section (the second line parallel section) 222b that extends in an extending direction of the source lines 214 and is formed from the first metal film 215. According to such a configuration, the gate line parallel section 222a that is formed from the second metal film 218 is less likely to cause any restriction in designing intervals between adjacent gate lines 213. Similarly, the source line parallel section 222b that is formed from the first metal film 215 is less likely to cause any restriction in designing intervals between adjacent source lines 214.

Fourth Embodiment

Next, a fourth embodiment of the present invention will be described with reference to FIGS. 14 to 17. In the fourth embodiment, arrangement and a configuration of a divisional light blocking section 322 are altered from those of the first and third embodiments. Similar configurations, operations, and effects as those of the first and third embodiments will not be described.

Figure 14:
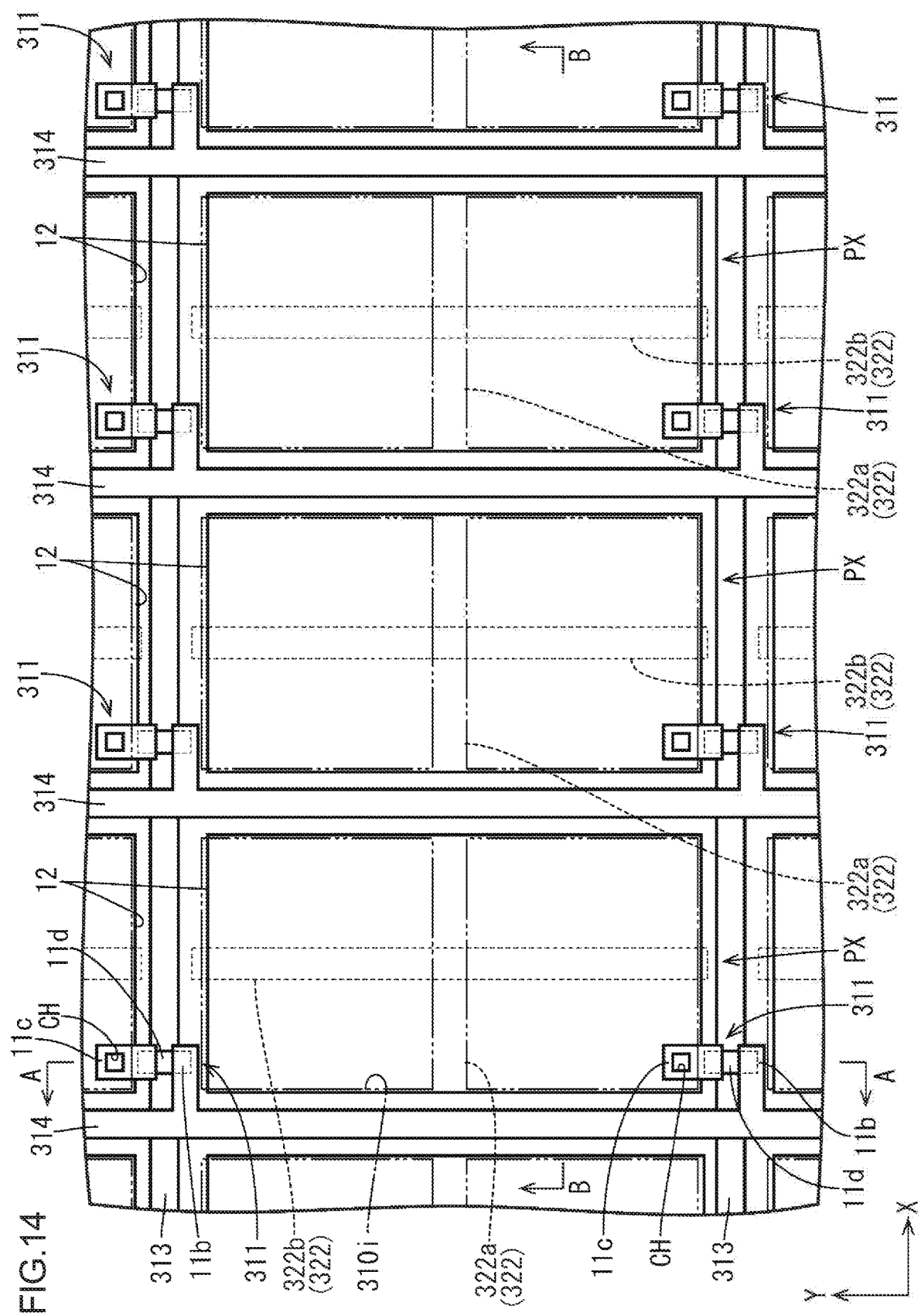
FIG. 14 is a plan view illustrating an array board included in a liquid crystal panel according to a fourth embodiment of the present invention.
Figure 15:
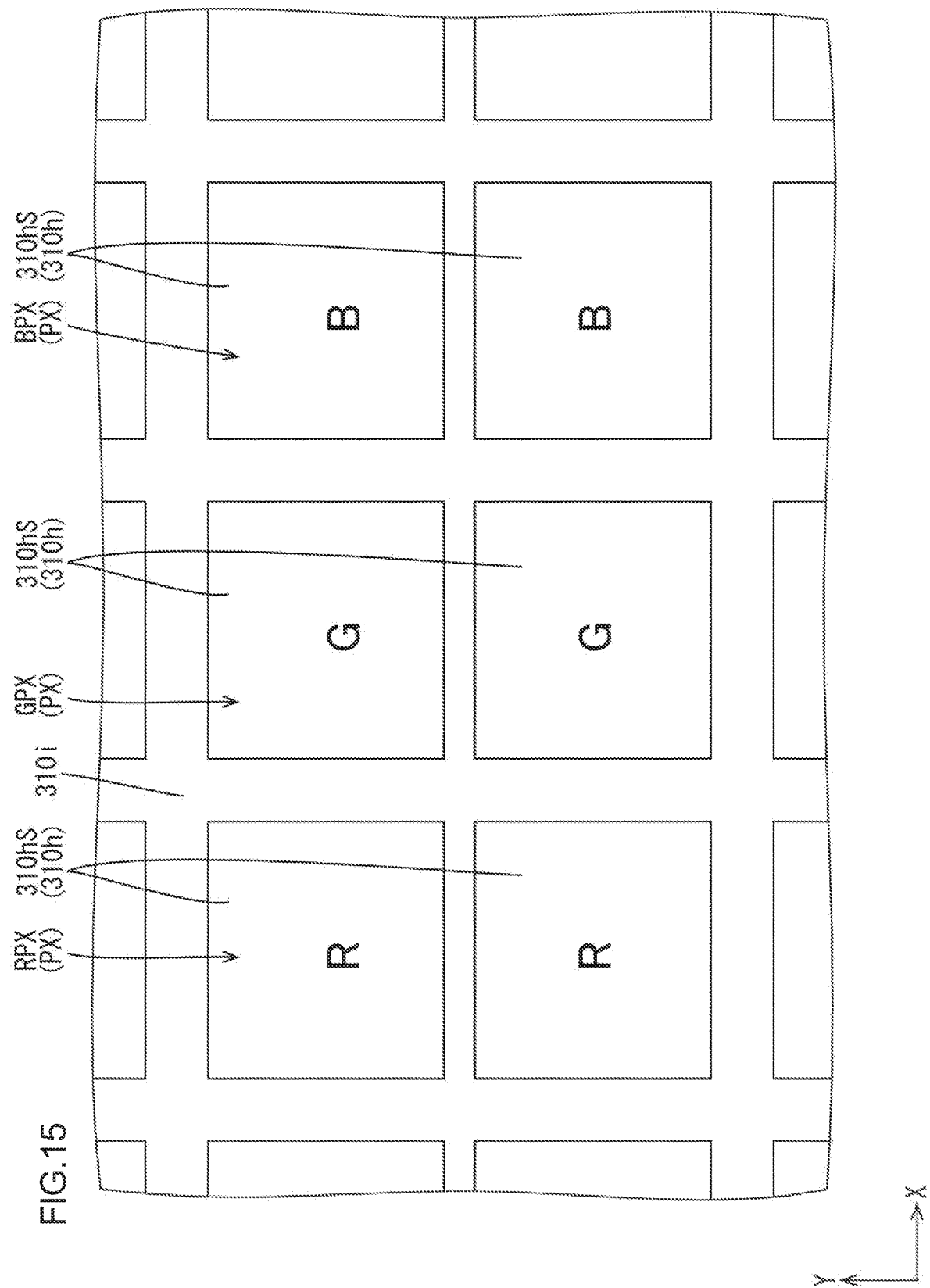
FIG. 15 is a plan view illustrating a CF board included in the liquid crystal panel.
Figure 16:
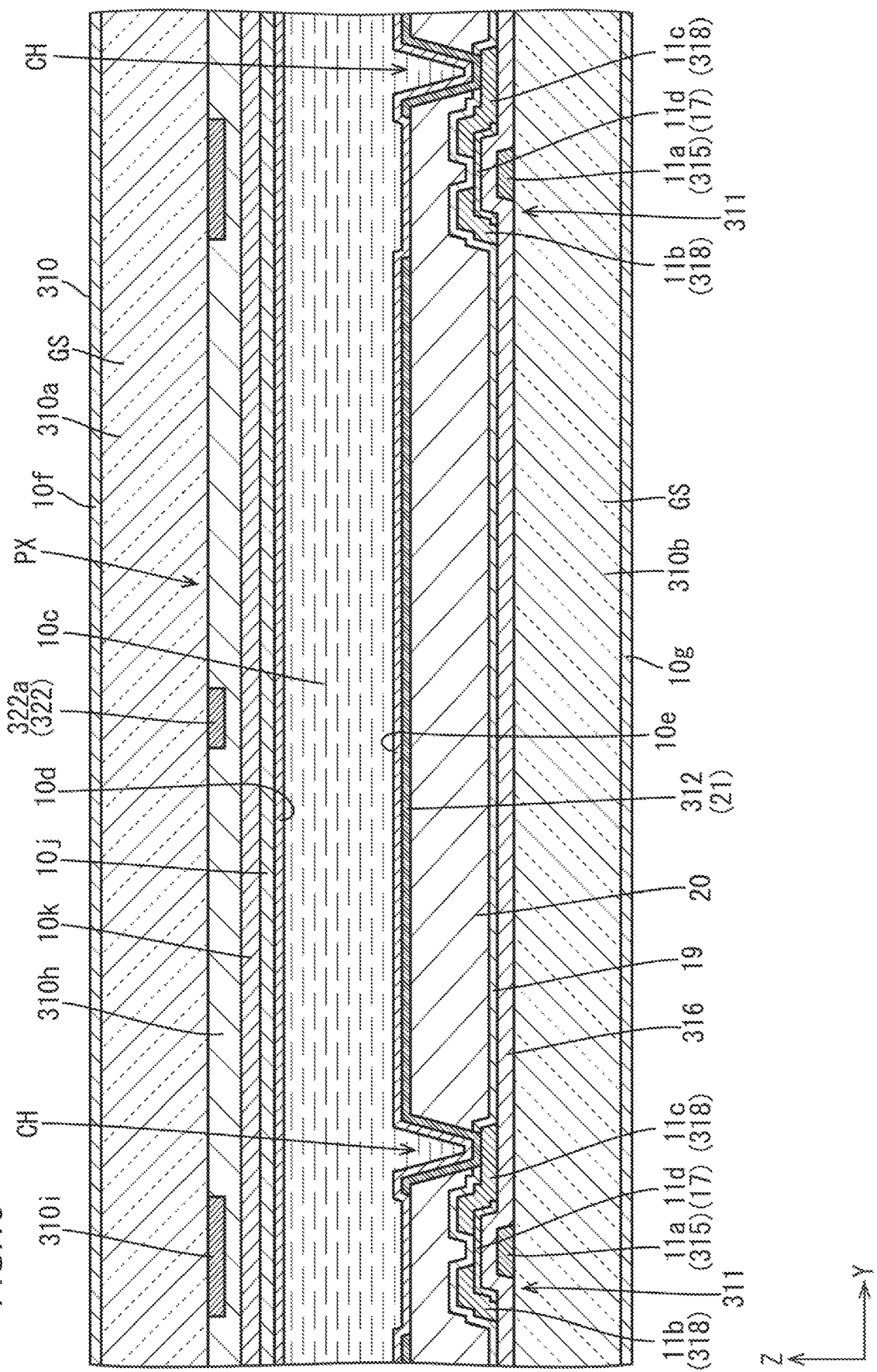
FIG. 16 is a cross-sectional view taken along line A-A in FIG. 14.
Figure 17:
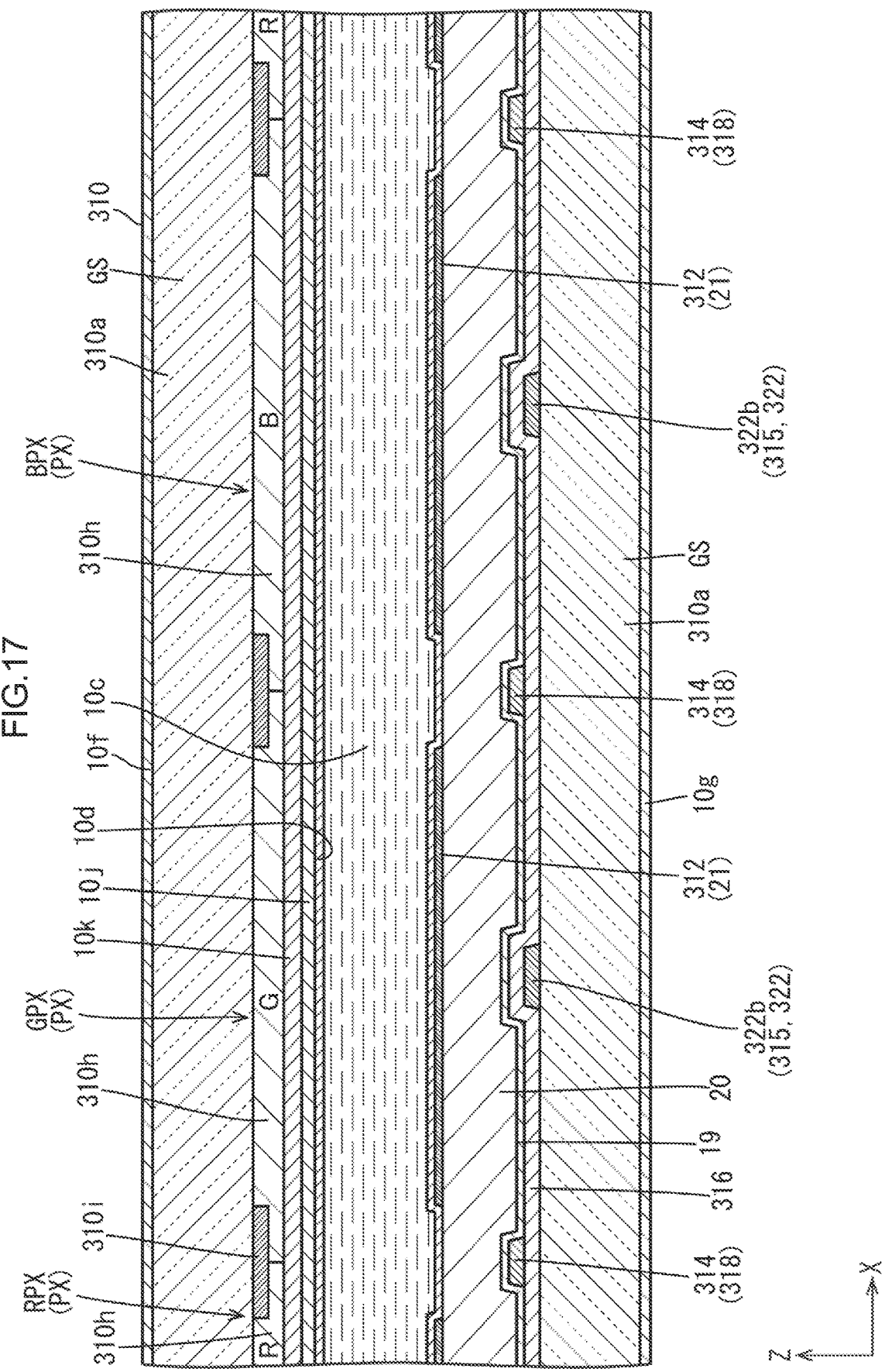
FIG. 17 is a cross-sectional view taken along line B-B in FIG. 14.
Figure 18:
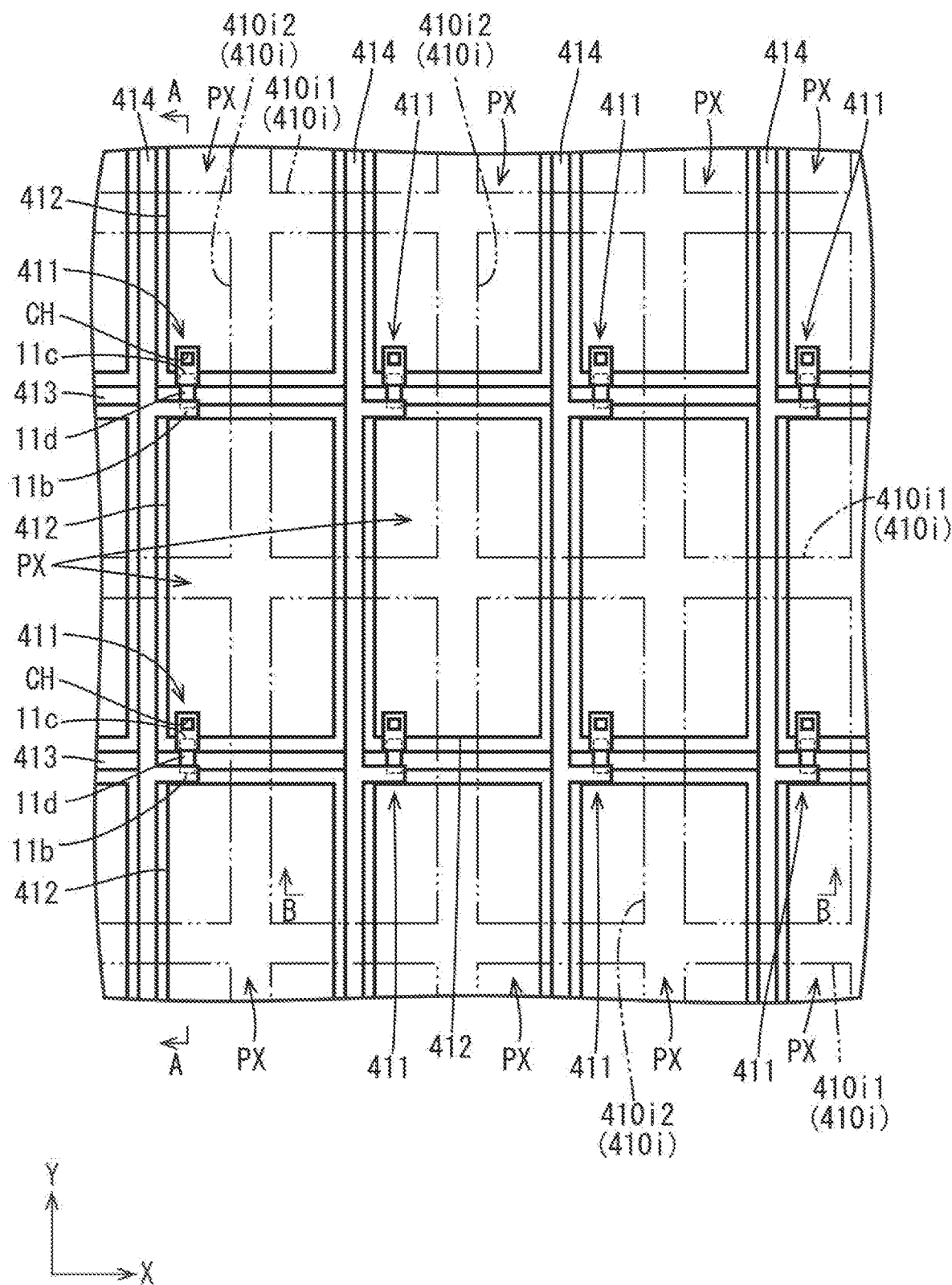
FIG. 18 is a plan view illustrating an array board included in a liquid crystal panel according to a fifth embodiment of the present invention.

As illustrated in FIGS. 14 and 15, the divisional light blocking sections 322 are included on both of a CF board 310a and an array board 310b, and gate line parallel sections 322a are included on the CF board 310a side and source line parallel sections 322b are included on the array board 310b side. As illustrated in FIGS. 15 and 16, the gate line parallel sections 322a are included in the same layer as a black matrix 310i on the CF board 310a. As illustrated in FIG. 15, both end portions of the gate line parallel section 322a in the longitudinal direction thereof, (the X-axis direction) overlap the black matrix 310i. Thus, the specific structure of the gate line parallel section 322a is similar to that of the first embodiment. A color filter 310h is divided into two divided color filters 310hS that are next to each other in the Y-axis direction having the gate line parallel section 322a therebetween. As illustrated in FIGS. 14 and 17, the source line parallel sections 322b are formed from the first metal film 315 that forms the gate lines 313. The source line parallel sections 322b are not formed from a metal film forming the source lines 314 that are parallel to the source line parallel sections 322b but formed from the first metal film 315 forming the gate lines 313 that are perpendicular to the source line parallel sections 322b. Thus, the specific structure of the source line parallel section 322b is similar to that of the third embodiment.

The divisional light blocking sections 322 that are included on the CF board 310a and the array board 310b are less likely to cause any restriction in producing the CF board 310a and the array board 310b compared to a configuration of the first and second embodiments including the divisional light blocking sections collectively on one of the CF board and the array board. Furthermore, the gate line parallel sections 322a are arranged parallel to the gate lines 313 that are arranged on the array board 310b at relatively great intervals and such gate line parallel sections 322a are included in the same layer as the black matrix 310i that is overlapped with the gate lines 313 and the source lines 314 and arranged in a grid on the CF board 310a. Therefore, the gate line parallel sections 322a can be easily formed. Furthermore, the source line parallel sections 322b that are formed from the first metal film 315 of the gate lines 313 on the array board 310b are less likely to cause any restriction in designing the intervals between adjacent source lines 314.

As described before, the present embodiment includes the array board 310b and the CF board 310a, and the array board 310b at least includes pixel electrodes 312 of the pixel sections PX and TFTs 311, and the CF board 310a at least includes the color filters 310h of the pixel section PX and the black matrix 310i. The divisional light blocking sections 322 are included on both of the array board 310b and the CF board 310a. According to such a configuration, the pixel electrodes 312 of the respective pixel sections PX are charged at a certain potential with the TFTs 311. The amount of transmission rays of light transmitting through the color filter 310h of each pixel section PX is controlled based on the potential of each pixel electrode 312 such that display operation is performed in each of the pixel sections PX at a certain gradation. The divisional light blocking sections 322 are included dispersedly on the array board 310b and the CF board 310a. According to such a configuration, the divisional light blocking sections 322 are less likely to cause any restriction in producing the array board 310b and the CF board 310a compared to a configuration including the divisional light blocking sections on one of the array board 310b and the CF board 310a.

The array board 310b at least includes the first metal film 315, the gate insulation film 316 included in an upper layer of the first metal film 315, the second metal film 318 included in an upper layer of the gate insulation film 316, the gate lines 313 connected to the TFTs 311 and formed from the first metal film 315, and the source lines 314 crossing the gate lines 313 and connected to the TFTs 311 and formed from the second metal film 318. The divisional light blocking section 322 includes the gate line parallel section 322a and the source line parallel section 322b, and the gate line parallel section 322*a* is included on the CF board 310*a* and in the same layer as the black matrix 310*i* and extends in the extending direction of the gate lines 313 and the source line parallel section 322*b* is included on the array board 310*b* and extends in the extending direction of the source lines 314 and is formed from the first metal film 315. The black matrix 310*i* that defines each of the adjacent pixel sections PX overlaps the gate lines 313 and the source lines 314. The interval between the adjacent gate lines 313 is generally larger than an interval between the adjacent source lines 314. Therefore, the gate line parallel sections 322*a* that are included in the same layer as the black matrix 310*i* on the CF board 310*a* are formed easily. The source line parallel section 322*b* that is formed from the first metal film 315 on the array board 310*b* is less likely to cause any restriction in designing the interval between the adjacent source lines 314.

Fourth Embodiment

Next, a fifth embodiment of the present invention will be described with reference to FIGS. 18 to 21. In the fifth embodiment, a black matrix 410*i* has a function different from that of the first embodiment. Similar configurations, operations, and effects as those of the first embodiment will not be described.

Figure 19:
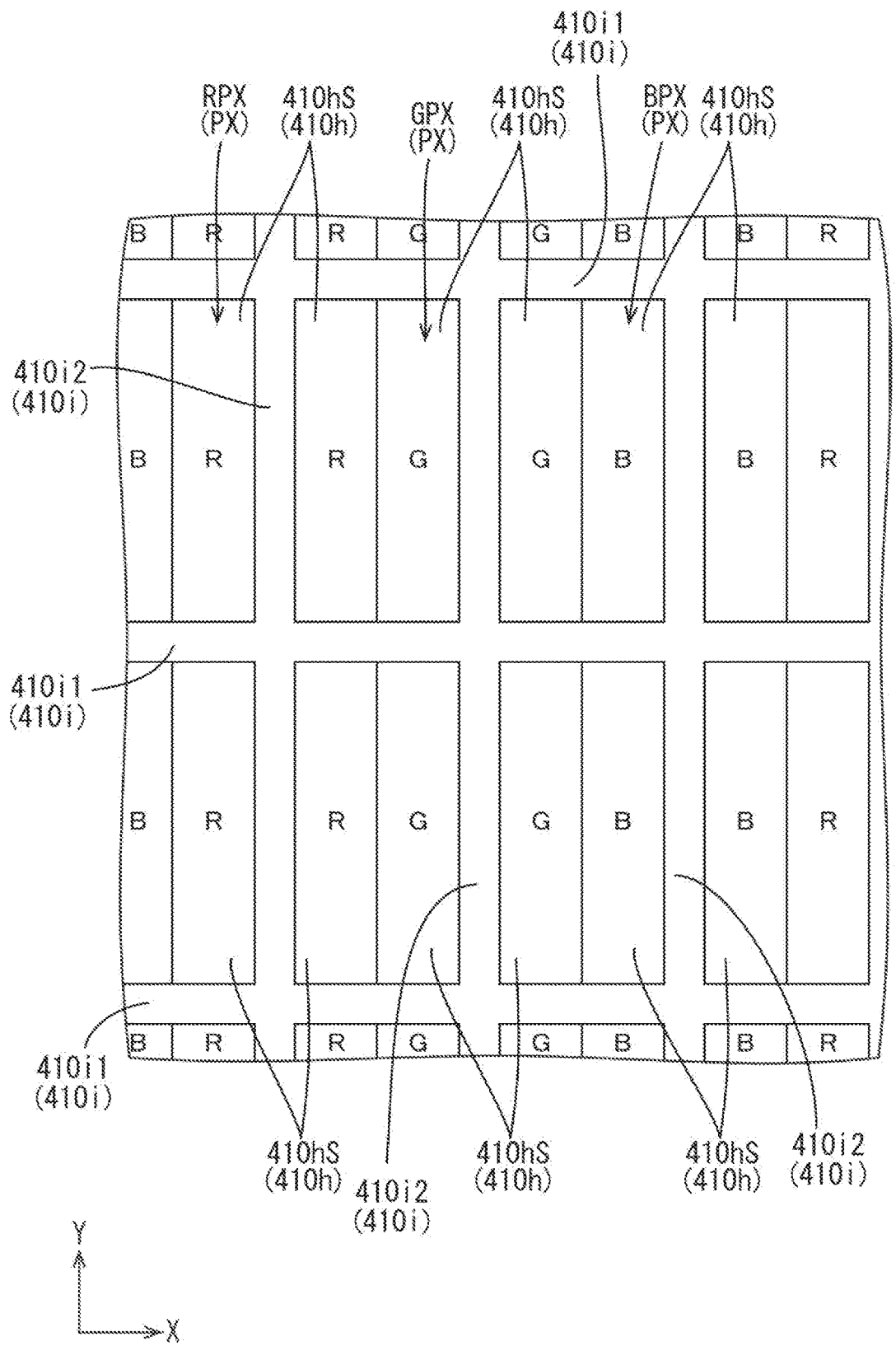
FIG. 19 is a plan view illustrating a CF board included in the liquid crystal panel.
Figure 20:
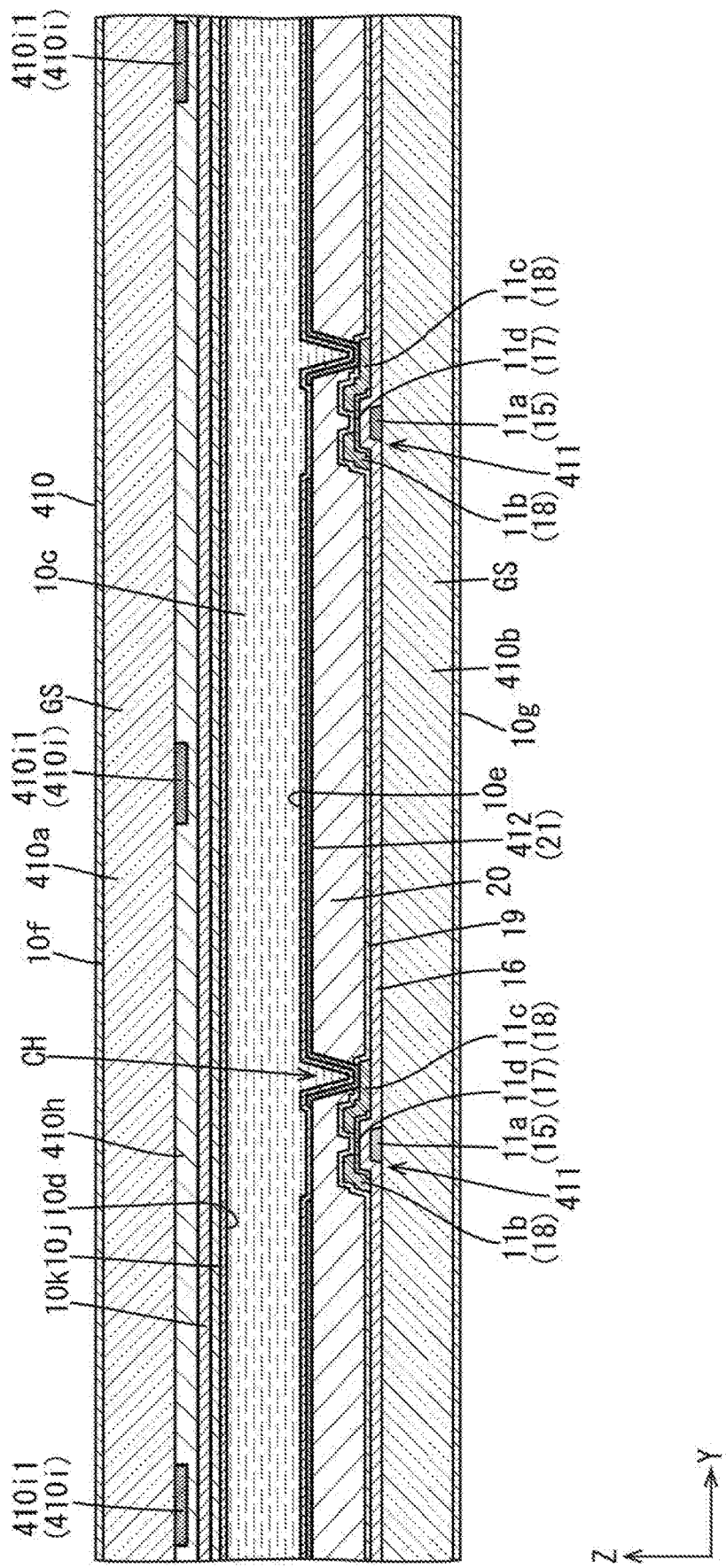
FIG. 20 is a cross-sectional view taken along line A-A in FIG. 18.

As illustrated in FIGS. 13 to 21, the black matrix 410*i* is arranged to divide the pixel section PX (a pixel electrode 412 and a color filter 410*h*) into multiple divided pixels PPX and is not arranged between the adjacent pixel sections PX to define each of the pixel sections PX. Namely, in this embodiment, the black matrix 410*i* does not function as the pixel in-between light blocking section but functions as a divisional light blocking section. Specifically, the black matrix 410*i* includes gate line parallel sections (the first line parallel section) 410*i*1 that are parallel to the extending direction of the gate lines 413 (the X-axis direction) and source line parallel sections (the second line parallel section) 410*i*2 that, are parallel to the extending direction of the source lines 414 (the Y-axis direction). The gate line parallel sections 410*i*1 cross a middle of each pixel section PX with respect to the Y-axis direction and the source line parallel sections 410*i*2 cross a middle of each pixel section PX with respect to the X-axis direction. As illustrated in FIG. 19, the color filter 410*h* is divided into four divided color filters 401*h*S exhibiting a same color with the black matrix 410*i* having the above structure. The four divided color filters 410*h*S configure each divided pixel PPX. As illustrated in FIGS. 19 and 20, the color filters 410*h* that are adjacent to each other and exhibit different colors are arranged in contact with each other without having the black matrix 410*i* therebetween.

As illustrated in FIGS. 13, 19 and 20, the gate lines 413 and the source lines 414 arranged on the array board 410*b* are arranged to define each of the adjacent pixel sections PX and function as the pixel in-between light blocking section similarly to the first embodiment. Specifically, the gate lines 413 are disposed between the pixel electrodes 412 that are adjacent to each other in the y-axis direction and overlap border sections between the color filters 410*h*, in a plan view, which are adjacent to each other in the Y-axis direction and exhibit the same color. The source lines 414 are disposed between the pixel electrodes 412 that are adjacent to each other in the X-axis direction and overlap border sections between the color filters 410*h*, in a plan view, which are adjacent to each other in the X-axis direction and exhibit different colors. The black matrix 410*i* that functions as the divisional light blocking section is wider than the gate lines 413 and the source lines 414 that function as the pixel in-between light blocking section.

The black matrix 410*i* that functions as the divisional light blocking section is included on the CF board 410*a* side. Therefore, an array board having the conventional structure can be used as the array board 410*b*. Accordingly, a manufacturing cost can be reduced. Furthermore, the gate lines 413 and the source lines 414 that function as the pixel in-between light blocking sections are included on the array board 410*b*. Therefore, there is less restriction in designing the black matrix 410*i* that functions as the divisional light blocking sections on the CF board 410*a*. In producing the liquid crystal panel 410 having the above configuration, an array board having the conventional structure is used as the array board 410*b* and the CF board 410*a* including the color filters 410*h* of each color arranged corresponding to the black matrix 410*i* exclusively for the present embodimenty is produced. Then, the boards 410*a* and 410*b* are bonded to each other such that the black matrix 410*i* is shifted from the gate lines 413 and thesource linbes 414 with respect to the X-axis direction and the Y-axis direction by about a distance of a half of the short-side dimension and the long-side dimension of the pixel section PX, respectively.

As described before, this embodiment includes the array board 410*b* and the CF bard 410*a*. The array board 410*b* at least includes the pixel electrodes 412 of the pixel sections PX, the TFTs 411, the gate lines 413 connected to the TFTs 411, and the source lines 414 crossing the gate lines 413 and connected to the TFTs 411, and the CF board 410*a* at least includes the color filters 410*h* of the pixel section PX. The pixel in-between light blocking sections are configured with the gate liens 413 and the source lines 414 and the black matrix 410*i* that is the divisional light blocking sections is disposed to divide the color filter 410*h* into multiple sections on the CF board 410*a*. According to such a configuration, the pixel electrodes 412 of the respective pixel sections PX are charged at a certain potential with the TFTs 411. The amount of transmission rays of light transmitting through the color filter 410*h* of each pixel section PX is controlled based on the potential of each pixel electrode 412 such that display operation is performed in each of the pixel sections PX at a certain gradation. The black matrix 410*i* that is the divisional light blocking section is disposed on the CF board 410*a* and divides the color filter 410*h* of each pixel section PX into multiple sections. The black matrix 410*i* that is the divisional light blocking section is included on the CF board 410*a* and therefore, an array board having the conventional structure can be used as the array board 410*b*. The pixel in-between light blocking section is configured with the gate lines 413 and the source lines 414 on the array board 410*b* and is not disposed on the CF board 410*a*. Therefore, there is less restriction in designing the black matrix 410*i* that is the divisional light blocking section.

Other Embodiments

The present invention is not limited to the embodiments, which have been described using the foregoing descriptions and the drawings. For example, embodiments described below are also included in the technical scope of the present invention.

(1) In each of the above embodiments, the pixel section is equally divided into multiple divided pixels with the divisional light blocking section. However, the pixel section may be divided into multiple divided pixels having different sizes (areas) with the divisional light blocking section.

(2) In each of the above embodiments, the pixel section is divided into four sections by the divisional light blocking section. However, the divisional light blocking section may be arranged such that the pixel section may be divided into two, three, five, or more than five. In such a configuration, the number of division is preferably a square number of the natural numbers such as nine or sixteen such that each of the divided pixels obtained with the divisional light blocking section has a similar shape to that of the pixel section.

(3) In each of the above embodiments, each of the divided pixels obtained with the divisional light blocking section has a shape similar to that of the pixel section. However, the pixel section may be divided by the divisional light blocking section such that the divided pixel has a shape not similar to that of the pixel section. In such a configuration, the divisional light blocking section may not have a plan view shape of a cross. For example, the pixel section may have a vertically elongated rectangular plan view shape and the divided pixel may have a plan view shape of a square, a diamond, a parallelogram, or a triangle. The pixel section may have a plan view shape of a horizontally elongated rectangular shape or a square.

(4) In each of the above embodiments, the divided pixels obtained with the divisional light blocking section has the same outlines. However, the pixel section may be divided by the divisional light blocking section such that the divided pixels have different outlines.

(5) In the above first to fourth embodiments, the divisional light blocking section is narrower than the black matrix. However, the divisional light blocking section may be wider than the black matrix or may have the same width as the black matrix.

(6) In the above first and fourth embodiments, the divisional light blocking sections included on the CF board are continuous from the black matrix. However, the divisional light blocking sections included on the CF board may not be continuous from the black matrix but may be configured to be separated from the black matrix.

(7) In the second embodiment, the divisional light blocking sections are disposed on the array board and formed from the third metal film that is conductive material having light blocking properties. However, the divisional light blocking sections may be formed from non-conductive material that has light blocking properties and does not have conductivity. Regarding arrangement of the third metal film on the array board with respect to a stacking direction, the third metal film is not necessarily between the interlayer insulation film and the flatting film but may be in other position. In such a configuration, an insulation film may be provided to avoid short-circuit between the third metal film and any other metal films or the transparent electrode film.

(8) In the second embodiment, the divisional light blocking sections are formed from the third metal film on the array board. However, one of the gate line parallel section and the source line parallel section of the divisional light blocking section may be formed from the third metal film and other one may be the first metal film or the second metal film. In such a configuration, it is preferable that the gate line parallel section is formed from the second metal film and the source line parallel section is formed from the first metal film.

(9) In the second embodiment, the divisional light blocking sections that are formed from the third metal film on the array board do not overlap the gate lines and the source lines. However, the divisional light blocking sections that are formed from the third metal film may overlap one of or both of the gate lines and the source lines.

(10) In the third embodiment, the gate line parallel sections included in the divisional light blocking section on the array board are formed from the second metal film and the source line parallel sections are formed from the first metal film. However, the gate line parallel sections included in the divisional light blocking sections may be formed from the first metal film and the source line parallel sections may be formed from the second metal film.

(11) In the third embodiment, the divisional light blocking section is formed from the first metal film and the second metal film on the array board. However, the divisional light blocking section may be formed only from the first metal film or may be formed only from the second metal film.

(12) In the second and third embodiments, the divisional light blocking section included on the array board side partially overlaps the black matrix included on the CF board side in a plan view. The divisional light blocking section included on the array board side may not overlap the black matrix included on the CF board side.

(13) In the second and third embodiments, the divisional light blocking section is formed from any one of the metal films on the array board. However, a cross-shaped hole may be formed in the pixel electrode in a plan view as the divisional light blocking section. Light is not transmitted through sections of the array board on which the pixel electrodes are not formed and the sections function as a light blocking section. Therefore, the above-described hole in the pixel electrode may function as the divisional light blocking section. Such a configuration may be applied to the second embodiment.

(14) In the fourth embodiment, the gate line parallel section of the divisional light blocking section is formed from the same material as the black matrix on the CF board, and the source line parallel, section of the divisional light blocking section is formed from the first metal film on the array board. However, the source line parallel section of the divisional light blocking section may be formed from the same material as the black matrix on the CF board, and the gate line parallel section of the divisional light blocking section may be formed from the first metal film or the second metal film on the array board.

(15) In the fourth embodiment, all of the gate line parallel sections of the divisional light blocking sections are formed on the CF board and all of the source line parallel sections are formed on the array board. However, some of the gate line parallel sections may be formed on the CF board and the rest of the gate line parallel sections may be formed on the array board, and some of the source line parallel sections may be formed on the CF board and the rest of the source line parallel sections may be formed on the array board.

(16) In the fifth embodiment, the divisional light blocking section is wider than the black matrix. However, the divisional light blocking section may be narrower than the black matrix or may have a same width as the black matrix.

(17) In each of the above embodiments, all of the pixel sections included in the liquid crystal panel are divided by the divisional light blocking sections. Part of the pixel sections included in the liquid crystal panel may be divided by the divisional light blocking sections and the liquid crystal panel may include pixel sections that are not divided by the divisional light blocking sections.

(18) In each of the above embodiments, the drain electrodes are formed of the second metal film that forms the source lines and the source electrodes. However, a resistance may be lowered in a section of a semiconductor film made of oxide semiconductor and the section of the lowered resistance may be used as the drain electrode.

(19) In each of the above embodiments, the semiconductor film included in the channel section of the TFT is formed of oxide semiconductor material. Other than that, polysilicon (CG silicon (continuous grain silicon) that is a kind of polycrystallized silicon (polycrystalline silicon)) or amorphous silicon may be used as material of the semiconductor film.

(20) In each of the above embodiments, the head-mounted display includes one liquid crystal panel displaying images for the right eye and images for the left eye or includes two liquid crystal panels for displaying images for the right eye and images for the left eye, respectively. However, the present invention may be applied to a head-mounted display including one liquid crystal panel displaying images for the right eye or images for the left eye and the displayed images may be formed on one of the user's eye. The head-mounted display having such a configuration is preferably used in a glasses type.

(21) Other than each of the above embodiments, specific optical configurations of the head-mounted display (the number of lenses or arrangement of the lenses) may be altered as appropriate.

(22) Other than the above embodiments, the specific material of the insulation films such as the gate insulation film, the interlayer insulation film, and the flattening film may be altered as appropriate.

(23) Other than the above embodiments, the specific material of the metal films such as the first metal film, the second metal film, and the third metal film may be altered as appropriate. A stacking structure of the metal films may be altered as appropriate, and the specific number of layers may be altered, or the metal film may have a single layer structure or may have an alloy structure.

(24) Other than the above, embodiment, the transparent electrode material used for the transparent electrode film may be altered as appropriate. For example, transparent electrode material such as indium tin oxide (ITO) or zinc oxide (ZnO) may be used.

(25) In the above embodiments, the liquid crystal panel including a vertical alignment (VA) mode as an operation mode includes only one layer of the transparent electrode film on the array board. However, two layers of transparent electrode films may be included having the interlayer insulation film therebetween. In such a configuration, one of the transparent electrode film may form the pixel electrode and another one may form an auxiliary capacitance electrode that forms static capacitance with the pixel electrode.

(26) In the above embodiments, the channel section of the TFT does not include an etch stop layer and a lower edge surface of the source electrode on the channel section side is contacted with an upper surface of the oxide semiconductor film. However, TFTs of an etch stop type including an etch stop layer in an upper layer of the channel section may be used.

(27) The above embodiment includes the liquid crystal panel that includes a vertical alignment (VA) mode as an operation mode. However, other liquid crystal panels are also included in the scope of the present invention, for example, a liquid crystal panel that includes an in-plane switching (IPS) mode or a fringe field switching (FFS) mode as an operation mode is also included in the scope of the present invention.

(28) In the above embodiments, the liquid crystal panel includes display pixels of three colors including red, green, and blue. In addition to the red, green and blue display pixels, yellow display pixel may be included and the liquid crystal panel including display pixels of four colors is also included in the scope of the present invention.

(29) The above embodiments may further include a functional panel, such as a touch panel and a parallax barrier panel (a switching liquid crystal panel), layered and attached to the liquid crystal panel.

(30) In the above embodiments, the liquid crystal panel is described as the embodiments. However, the present invention may be applied to other types of display panels (e.g., plasma display panels (PDPs), organic EL panels, electrophoretic display (EPD) panels, micro electro mechanical systems (MEMS) display panels).

(31) In each of the above embodiments, the head-mounted display is used as an example. However, a head-up display or a projector may be used as a device for magnifying images displayed on the liquid crystal panel using a lens. The present invention may be applied to a liquid crystal display device without having a magnifying display function (such as television devices, tablet-type terminals, and smartphones).

EXPLANATION OF SYMBOLS 10, 110, 210, 310, 410: liquid crystal panel (display device), 10a, 110a, 210a, 310a, 410a: CF board (second board), 10b, 110b, 210b, 310b, 410b: array board (first board), 10h, 410h, 410h: color filter (color portion), 10i, 110i, 210i, 310i: black matrix (pixel in-between light blocking section), 11, 111, 311, 411: TFT (switching component), 12, 112, 312, 412: pixel electrode, 13, 113, 213, 313: gate electrode (first line), 14, 114, 214, 314: source line (second line), 15, 115, 215, 315: first metal film, 16, 116, 316: gate insulation film (insulation film), 18, 118, 218, 318: second metal film, 22, 122, 222, 322: divisional light, blocking section, 22a, 122a, 222a, 322a: gate line parallel section (first line parallel section), 22b, 122b, 222b, 322b: source line parallel section (second line parallel section), 23: third metal film, 410i: black matrix (divisional light blocking section), 410i1: gate line parallel section (first line parallel section), 410i2: source line parallel section (second line parallel section), 413: gate line (pixel in-between light blocking section), 414: source line (pixel in-between light blocking section), EY: eyeball (eye), EYa: crystalline lens (eye), EYb: retina (eye), HD: head, HMD: head-mounted display, HMDa: head mounting device, PX: pixel section, PXX: divided pixel, RE: lens

The invention claimed is:

1. A display device comprising:
   pixel sections;
   a pixel in-between light blocking section disposed to define each of the pixel sections that are adjacent to each other;
   switching components connected to the pixel sections and configured to drive the pixel sections, respectively;
   a divisional light blocking section disposed to divide the pixel section into divided pixels;
   a first board at least including pixel electrodes included in the pixel sections and the switching components; and
   a second board at least including color portions included in the pixel sections and the pixel in-between light blocking section;
   wherein
   each of the pixel sections have a square plan view shape, and
   the divisional light blocking section divides the pixel section into four divided pixels such that the divided pixel has a shape similar to that of the pixel section; and wherein
the divisional light blocking section is included in a same layer as the pixel in-between light blocking section on the second board.

2. A display device comprising:
pixel sections;
a pixel in-between light blocking section disposed to define each of the pixel sections that are adjacent to each other;
switching components connected to the pixel sections and configured to drive the pixel sections, respectively;
a divisional light blocking section disposed to divide the pixel section into divided pixels;
a first board at least including pixel electrodes included in the pixel sections and the switching components; and
a second board at least including color portions included in the pixel sections and the pixel in-between light blocking section;
wherein
each of the pixel sections have a square plan view shape, and
the divisional light blocking section divides the pixel section into four divided pixels such that the divided pixel has a shape similar to that of the pixel section;
wherein
the divisional light blocking section is included on the first board; and
wherein
the first board at least includes a first metal film, an insulation film disposed on the first metal film, a second metal film disposed on the insulation film, first lines formed from the first metal film and connected to the switching components, respectively, and second lines formed from the second metal film and crossing the first lines and connected to the switching components, respectively, and
the divisional light blocking section partially overlaps the pixel in-between light blocking section and does not overlap the first lines and the second lines.

3. The display device according to claim 2, wherein
the first board at least includes a third metal film in a different layer from the first metal film and the second metal film, and
the divisional light blocking section is formed from the third metal film.

4. The display device according to claim 2, wherein the divisional light blocking section is formed from at least one of the first metal film and the second metal film.

5. The display device according to claim 4, wherein
the divisional light blocking section includes a first line parallel section that extends in an extending direction of the first lines and is formed from the second metal film and a second line parallel section that extends in an extending direction of the second lines and is formed from the first metal film.

6. A display device comprising:
pixel sections;
a pixel in-between light blocking section disposed to define each of the pixel sections that are adjacent to each other;
switching components connected to the pixel sections and configured to drive the pixel sections, respectively;
a divisional light blocking section disposed to divide the pixel section into divided pixels;
a first board at least including pixel electrodes included in the pixel sections and the switching components; and
a second board at least including color portions included in the pixel sections and the pixel in-between light blocking section, wherein
the divisional light blocking section is included on the first board and the second board.

* * * * *